(12) United States Patent
Helmke

(10) Patent No.: US 11,683,739 B2
(45) Date of Patent: *Jun. 20, 2023

(54) RADIO LINK AGGREGATION

(71) Applicant: Telefonaktiebolaget LM Ericsson (publ), Stockholm (SE)

(72) Inventor: Holger Helmke, Ditzingen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/237,531

(22) Filed: Apr. 22, 2021

(65) Prior Publication Data
US 2021/0243668 A1 Aug. 5, 2021

Related U.S. Application Data

(63) Continuation of application No. 16/257,390, filed on Jan. 25, 2019, now Pat. No. 10,993,162, which is a
(Continued)

(51) Int. Cl.
*H04W 40/00* (2009.01)
*H04L 25/14* (2006.01)
(Continued)

(52) U.S. Cl.
CPC ........... *H04W 40/00* (2013.01); *H04L 25/14* (2013.01); *H04L 45/245* (2013.01); *H04W 28/06* (2013.01); *H04W 72/12* (2013.01)

(58) Field of Classification Search
None
See application file for complete search history.

(56) References Cited

U.S. PATENT DOCUMENTS 5,835,498 A * 11/1998 Kim .................... H04J 3/0605
370/542
6,717,933 B1 * 4/2004 Sonning ............ H03M 13/2792
370/441
(Continued)

FOREIGN PATENT DOCUMENTS

EP 0718996 A2 6/1996
EP 1150447 A2 10/2001
(Continued)

OTHER PUBLICATIONS

Adiseshu et al., "A Reliable and Scalable Striping Protocol," ACM SIGCOMM '96 Conference: Applications, Technologies, Architectures, and Protocols for Computer Communications, Aug. 26-30, 1996, pp. 130-141, Stanford University, CA, US.
(Continued)

*Primary Examiner* — Dhairya A Patel
(74) *Attorney, Agent, or Firm* — Coats & Bennett, PLLC

(57) ABSTRACT

A network device distributes a plurality of symbol blocks, received via a plurality of input streams, to a plurality of output links comprised in a defined connection according to a mapping of the symbol blocks to the output links. Responsive to an input stream of the plurality of input streams being empty such that an expected symbol block is not received, the network device distributes idle data to the output link mapped to the expected symbol block to maintain the mapping of the symbol blocks to the output links. The network device transmits the symbol blocks and idle data over the defined connection via the plurality of output links and according to the distribution.

18 Claims, 12 Drawing Sheets

Related U.S. Application Data continuation of application No. 13/132,235, filed as application No. PCT/EP2008/066547 on Dec. 1, 2008, now Pat. No. 10,237,804.

(51) Int. Cl.
*H04L 45/24* (2022.01)
*H04W 28/06* (2009.01)
*H04W 72/12* (2023.01)

(56) References Cited

U.S. PATENT DOCUMENTS

| | | | | |
|---|---|---|---|---|
| 8,064,528 | B2* | 11/2011 | Giannakis | H04L 27/2672 375/260 |
| 8,331,310 | B2* | 12/2012 | Wang | H04L 5/0007 370/330 |
| 2002/0075854 | A1 | 6/2002 | Kumar et al. | |
| 2003/0031120 | A1 | 2/2003 | Miyato et al. | |
| 2003/0118054 | A1* | 6/2003 | Zhu | H04L 45/00 370/392 |
| 2003/0152112 | A1* | 8/2003 | Almog | H04L 25/14 370/535 |
| 2004/0100944 | A1* | 5/2004 | Richmond | H04L 45/02 370/360 |
| 2004/0224673 | A1* | 11/2004 | Satou | H04W 4/02 455/414.3 |
| 2007/0297342 | A1* | 12/2007 | Yasuta | H04L 69/12 370/252 |
| 2008/0225935 | A1* | 9/2008 | Reddy | H04L 25/03834 375/E1.034 |
| 2009/0010180 | A1* | 1/2009 | Xue | H04L 47/70 370/254 |
| 2009/0046573 | A1* | 2/2009 | Damnjanovic | H04J 11/0093 370/216 |
| 2009/0061887 | A1* | 3/2009 | Hart | H04W 24/10 455/450 |
| 2009/0074094 | A1* | 3/2009 | Palanki | H04L 27/10 375/299 |
| 2009/0103649 | A1* | 4/2009 | Vare | H04L 27/0008 375/295 |
| 2009/0187949 | A1* | 7/2009 | Vare | H04L 5/0053 725/54 |
| 2009/0190677 | A1* | 7/2009 | Jokela | H04L 5/0053 375/260 |
| 2009/0201796 | A1* | 8/2009 | Roberts | H04B 10/6971 370/210 |
| 2009/0303867 | A1* | 12/2009 | Lee | H04L 27/2675 370/210 |
| 2009/0303958 | A1* | 12/2009 | Vesma | H04L 5/0044 370/458 |
| 2010/0034312 | A1* | 2/2010 | Muharemovic | H04L 5/0023 375/267 |
| 2010/0067480 | A1* | 3/2010 | Wang | H04L 5/0048 370/330 |
| 2010/0080173 | A1* | 4/2010 | Takagi | H04L 27/0006 370/328 |
| 2010/0086087 | A1* | 4/2010 | Pekonen | H04L 1/0079 375/346 |
| 2011/0142158 | A1* | 6/2011 | Reznic | H04N 19/60 375/295 |

FOREIGN PATENT DOCUMENTS

| | | | | |
|---|---|---|---|---|
| EP | 1255369 | A1 | 11/2002 | |
| GB | 2423898 | A * | 9/2006 | H04L 27/261 |
| GB | 2423898 | A | 9/2006 | |
| WO | 9723073 | A1 | 6/1997 | |

OTHER PUBLICATIONS

Snoeren, A C, "Adaptive Inverse Multiplexing for Wide-Area Wireless Networks," Global Telecommunications Conference—Globecom '99, Global Internet:Application and Technology, vol. 3, Dec. 5, 1999, pp. 1665-1672.

Adiseshu, H. "A Reliable and Scalable Striping Protocol", ACM SIGCOMM Computer Communication Review 26(4), Oct. 1, 1996, pp. 1-11, retrieved on Oct. 19, 2018, retrieved from http://citeseerx.ist.psu.edu/viewdoc/download?doi=10.1.1.51.2255&rep=rep1&type=pdf.

ITU-T, "Link capacity adjustment scheme (LCAS) for virtual concatenated signals", Series G: Transmission Systems and Media, Digital Systems and Networks, Data over Transport—Generic aspects—General, Series Y: Global Information Infrastructure, Internet Protocol, Aspects and Next Generation Networks, Internet protocol aspects—Transport, G.7042/Y.1305, Mar. 1, 2006, pp. 1-38, ITU-T.

ITU-T, "Virtual concatenation of plesiochronous digital hierarchy (PDH) signals", Series G: Transmission Systems and Media, Digital Systems and Networks, Data Over Transport—Generic aspects—General, Series Y: Global Information Infrastructure, Internet Protocol, Aspects and Next Generation Networks, Internet protocol aspects—Transport, G.7043/Y.1343, Jul. 1, 2004, pp. 1-16, ITU-T.

* cited by examiner

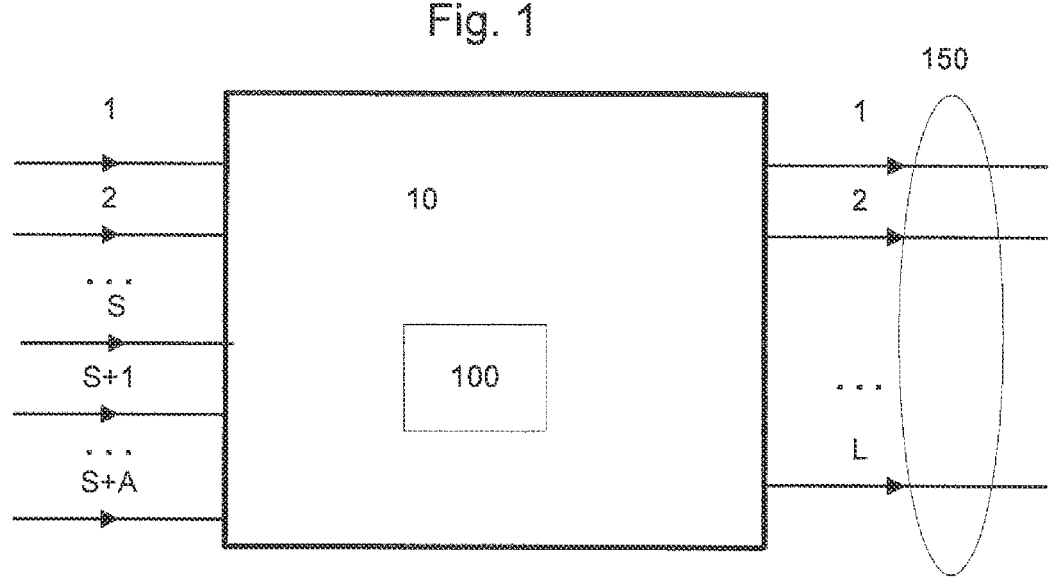
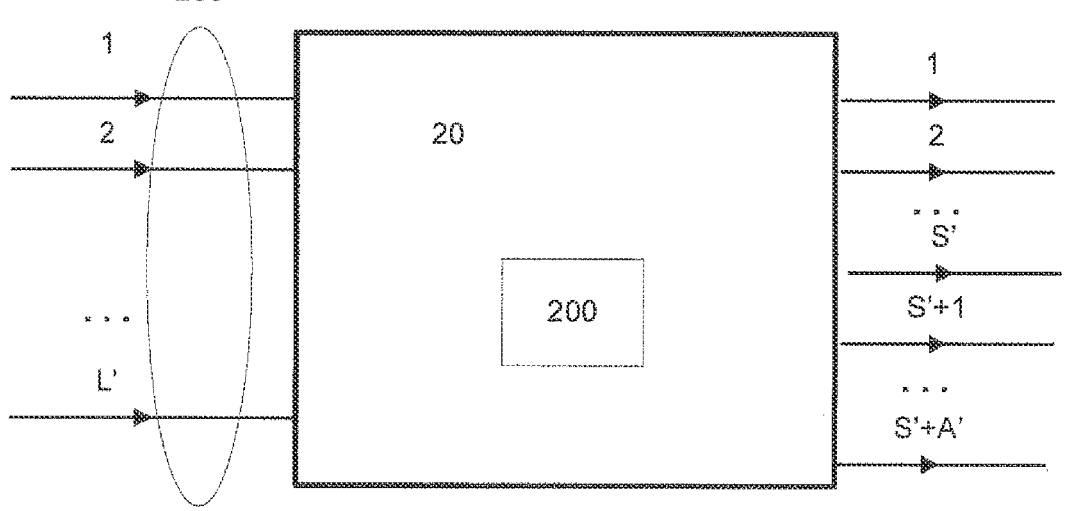

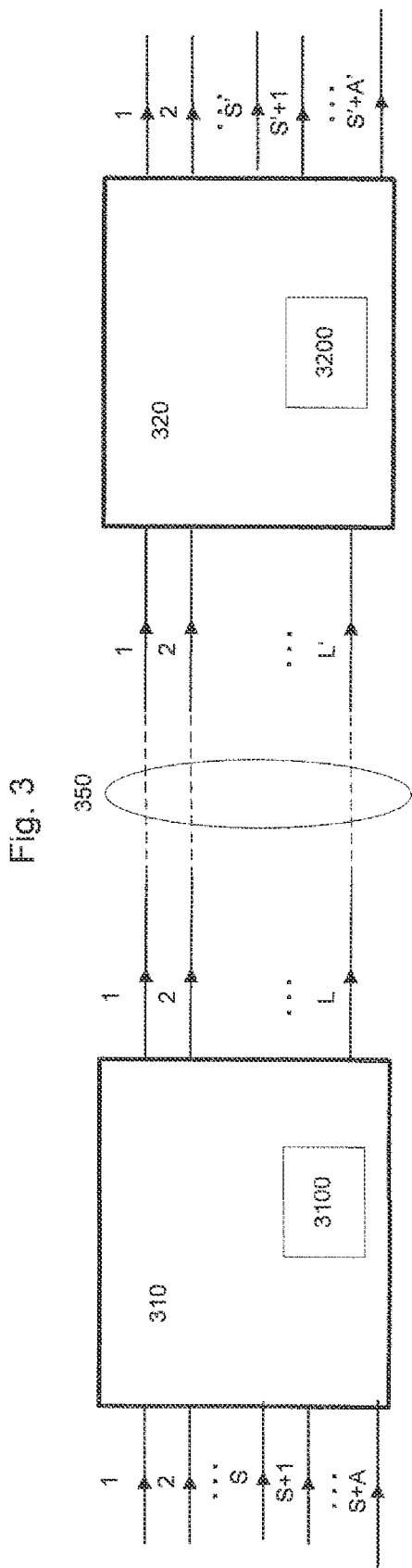

Fig. 10

| Index | Service Id | Link Id |
|---|---|---|
| 1 | 1 | 1 |
| 2 | 1 | 1 |
| 3 | 2 | 2 |
| 4 | 3 | 2 |
| 5 | 4 | 3 |
| 6 | 1 | 1 |
| 7 | 1 | 1 |
| 8 | 2 | 2 |
| 9 | 3 | 2 |
| 10 | 4 | 3 |
| 11 | 1 | 4 |
| 12 | 1 | 1 |
| 13 | 2 | 2 |
| ... | ... | ... |
| V-2 | 1 | 1 |
| V-1 | 3 | 1 |
| V | 4 | 3 |

Fig. 11

| Index | Service Id | Link Id | #Bytes |
|---|---|---|---|
| 1 | 1 | 1 | 2 |
| 2 | 1 | 1 | 2 |
| 3 | 2 | 2 | 2 |
| 4 | 3 | 2 | 2 |
| 5 | 4 | 3 | 2 |
| 6 | 1 | 1 | 2 |
| 7 | 1 | 1 | 2 |
| 8 | 2 | 2 | 1 |
| 9 | 3 | 2 | 2 |
| 10 | 4 | 3 | 2 |
| 11 | 1 | 4 | 2 |
| 12 | 1 | 1 | 2 |
| 13 | 2 | 2 | 2 |
| ... | ... | ... | ... |
| V-2 | 1 | 1 | 2 |
| V-1 | 3 | 1 | 2 |
| V | 4 | 3 | 1 |

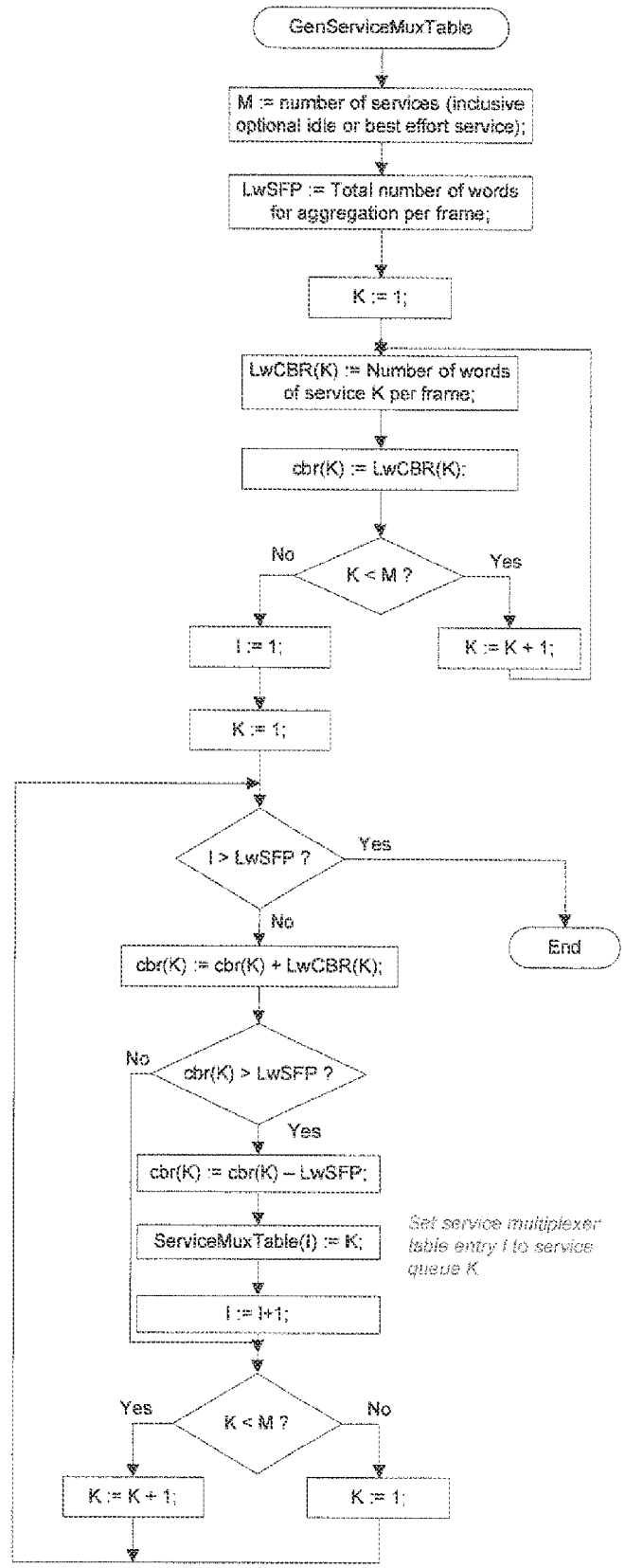

Fig. 14A

Example A: Generate Service-Mux Table

| Round | I | K | Operations | ServiceMuxTable | I | K |
|---|---|---|---|---|---|---|
| 1 | 1 | 1 | cbr(1) := 6 + 6 = 12 ≥ LwSFP (!)<br>cbr(1) := 12 − 8 = 4 | ServiceMuxTable(1) := 1 | 2 | 2 |
| 2 | 2 | 2 | cbr(2) := 2 + 2 = 4 < LwSFP | - | 2 | 1 |
| 3 | 2 | 1 | cbr(1) := 4 + 6 = 10 ≥ LwSFP (!)<br>cbr(1) := 10 − 8 = 2 | ServiceMuxTable(2) := 1 | 3 | 2 |
| 4 | 3 | 2 | cbr(2) := 4 + 2 = 6 < LwSFP | - | 3 | 1 |
| 5 | 3 | 1 | cbr(1) := 2 + 6 = 8 ≥ LwSFP (!)<br>cbr(1) := 8 − 8 = 0 | ServiceMuxTable(3) := 1 | 4 | 2 |
| 6 | 4 | 2 | cbr(2) := 6 + 2 = 8 ≥ LwSFP (!)<br>cbr(2) := 8 − 8 = 0 | ServiceMuxTable(4) := 2 | 5 | 1 |
| 7 | 5 | 1 | cbr(1) := 0 + 6 = 6 < LwSFP | - | 5 | 2 |
| 8 | 5 | 2 | cbr(2) := 0 + 2 = 2 < LwSFP (!) | - | 5 | 1 |
| 9 | 5 | 1 | cbr(1) := 6 + 6 = 12 ≥ LwSFP (!)<br>cbr(1) := 12 − 8 = 4 | ServiceMuxTable(5) := 1 | 6 | 2 |
| 10 | 6 | 2 | cbr(2) := 2 + 2 = 4 < LwSFP | - | 6 | 1 |
| 11 | 6 | 1 | cbr(1) := 4 + 6 = 10 ≥ LwSFP (!)<br>cbr(1) := 10 − 8 = 2 | ServiceMuxTable(6) := 1 | 7 | 2 |
| 12 | 7 | 2 | cbr(2) := 4 + 2 = 6 < LwSFP | - | 7 | 1 |
| 13 | 7 | 1 | cbr(1) := 2 + 6 = 8 ≥ LwSFP (!)<br>cbr(1) := 8 − 8 = 0 | ServiceMuxTable(7) := 1 | 8 | 2 |
| 14 | 8 | 2 | cbr(2) := 6 + 2 = 8 ≥ LwSFP (!)<br>cbr(2) := 8 − 8 = 0 | ServiceMuxTable(8) := 2 | 9 | 1 |

→ End

Fig. 14B

Example A: Generate Link-Mux Table

| Round | input I | input K | Operations | LinkMuxTable | output I | output K |
|---|---|---|---|---|---|---|
| 1 | 1 | 1 | lsf(1) := 2 + 2 = 4 < LwSFP<br>lsf(1) := 12 − 8 = 4 | - | 1 | 2 |
| 2 | 1 | 2 | lsf(2) := 5 + 5 = 10 ≥ LwSFP (!)<br>lsf(2) := 10 − 8 = 2 | LinkMuxTable(1) := 2 | 2 | 3 |
| 3 | 2 | 3 | lsf(3) := 1 + 1 = 2 < LwSFP | - | 2 | 1 |
| 4 | 2 | 1 | lsf(1) := 4 + 2 = 6 < LwSFP | - | 2 | 2 |
| 5 | 2 | 2 | lsf(2) := 2 + 5 = 7 < LwSFP | - | 2 | 3 |
| 6 | 2 | 3 | lsf(3) := 2 + 1 = 3 < LwSFP | - | 2 | 1 |
| 7 | 2 | 1 | lsf(1) := 6 + 2 = 8 ≥ LwSFP (!)<br>lsf(1) := 8 − 8 = 0 | LinkMuxTable(2) := 1 | 3 | 2 |
| 8 | 3 | 2 | lsf(2) := 7 + 5 = 12 ≥ LwSFP (!)<br>lsf(2) := 12 − 8 = 4 | LinkMuxTable(3) := 2 | 4 | 3 |
| 9 | 4 | 3 | lsf(3) := 3 + 1 = 4 < LwSFP | - | 4 | 1 |
| 10 | 4 | 1 | lsf(1) := 0 + 2 = 2 < LwSFP | - | 4 | 2 |
| 11 | 4 | 2 | lsf(2) := 4 + 5 = 9 ≥ LwSFP (!)<br>lsf(2) := 9 − 8 = 1 | LinkMuxTable(4) := 2 | 5 | 3 |
| 12 | 5 | 3 | lsf(3) := 4 + 1 = 5 < LwSFP | - | 5 | 1 |
| 13 | 5 | 1 | lsf(1) := 2 + 2 = 4 < LwSFP | - | 5 | 2 |
| 14 | 5 | 2 | lsf(2) := 1 + 5 = 6 < LwSFP | - | 5 | 3 |
| 15 | 5 | 3 | lsf(3) := 5 + 1 = 6 < LwSFP | - | 5 | 1 |
| 16 | 5 | 1 | lsf(1) := 4 + 2 = 6 < LwSFP | - | 5 | 2 |
| 17 | 5 | 2 | lsf(2) := 6 + 5 = 11 ≥ LwSFP (!)<br>lsf(2) := 11 − 8 = 3 | LinkMuxTable(5) := 2 | 6 | 3 |
| 18 | 6 | 3 | lsf(3) := 6 + 1 = 7 < LwSFP | - | 6 | 1 |
| 19 | 5 | 1 | lsf(1) := 6 + 2 = 8 ≥ LwSFP (!)<br>lsf(1) := 8 − 8 = 0 | LinkMuxTable(6) := 1 | 7 | 2 |
| 20 | 5 | 2 | lsf(2) := 7 + 5 = 12 ≥ LwSFP (!)<br>lsf(2) := 12 − 8 = 4 | LinkMuxTable(7) := 2 | 8 | 3 |
| 21 | 8 | 3 | lsf(2) := 7 + 1 = 8 ≥ LwSFP (!)<br>lsf(2) := 8 − 8 = 0 | LinkMuxTable(8) := 3 | 9 | 1 |

→ End

RADIO LINK AGGREGATION

RELATED APPLICATIONS

This application is a continuation of prior U.S. application Ser. No. 16/257,390 filed 25 Jan. 2019, which is a continuation of U.S. application Ser. No. 13/132,235, filed 21 Jul. 2011, issued as U.S. Pat. No. 10,237,804, which is the National Phase of International Application No. PCT/EP2008/066547, filed 1 Dec. 2008, the entire disclosure of each being hereby incorporated by reference herein.

TECHNICAL FIELD

The present invention relates to communication in a network and more particularly to a network entity for grouping traffic onto a defined connection, a network entity for ungrouping traffic in a communication network from a defined connection, a system for exchanging traffic in a communication network over a defined connection and corresponding methods.

BACKGROUND

The present invention relates to transmissions in a communication network and in particular it is concerned with multiplexing and bundling techniques for transmission in a communication network.

Traditional networks are designed for Time Division Multiplexing (TDM) services (for instance Synchronous Optical Network (SONET)/Synchronous Digital Hierarchy (SDH)/Plesiochronous Digital Hierarchy (PDH)). This networks are typically designed for supporting peak usage of bandwidth requirements and require a high reliability. TDM systems must be designed with sufficient link margin to guarantee transmission even under worst case condition like rain and fading. Furthermore SONET/SDH radio systems typically install redundant links for radio protection switching. Thus under normal circumstances TDM networks are underutilized and have spare capacity.

Besides the traditional transmission of TDM services there is an increasing demand for the transmission of computer data (e.g. Ethernet/Internet Protocol (IP)). This data is "bursty" and is transmitted in packets. Packet networks profit from radio links which uses adaptive modulation to offer a higher bandwidth under good environmental conditions.

There is a demand for support of faster interface ports, too. Examples are Gigabit Ethernet for packet services or STM-4 for traditional TDM services. However, traditional TDM radio links are not designed for such high bandwidth. This is because of technical but also because of regulative reasons.

Technical reasons comprise limited resolution of available ADCs (analog-digital-converters) and/or DACs (digital-analog-converters), complex design of highly selective analog wideband filters, desired system modularity (i.e. possibility to extend the capacity later), trade-offs between modulation order and oscillator phase noise sensibility, new technologies as digital amplifier linearization which requires much higher sampling rate than the bandwidth of the user data, thermal problems, etc. Regulative reasons comprise fixed assignment of maximum transmission power and channel bandwidth by regional regulation authorities.

Under the circumstances described above it is clear that it is often not possible to transmit higher data rates over a single radio link. Link bundling can be used to overcome this bottleneck. This allows the transmission of Gigabit Ethernet (GbE) or STM-4.

It is known in the art parallel usage of TDM and packet services. Adaptive modulation and coding is also known. However, the known techniques suffer from a limited bandwidth capacity limited to the capacity of the single therein described and suggested link.

Nowadays there exists radio system which bundles two or more synchronous radio channels to form an aggregated channel with a higher bandwidth (e.g. for transmission of a STM-4 channel over 2 or for 4 radio channels). These SDH or SONET radio transmission systems generally require a high reliability and use radio protection switching. However, the known mentioned implementation is not flexible and limited to very special cases, namely transmission of ST-4 over 2 or more radio links.

There are also many systems documented which aggregate multiple links to form a service independent port with a higher bandwidth as each single link. With a TDM sub layer like SDH high rate packet services are transmitted over an aggregation of virtual TDM links. International Telecommunications Union (ITU)-T G.707 and ITU-T G.783 discloses such an inverse multiplexing technique for SDH networks (see Virtual Concatenation (VCAT)). The Link Capacity Adjustment Scheme (LCAS) specified in ITU-T G.7042 allows dynamically changing the bandwidth of virtual concatenated containers. A more flexible system is described in Hari Adiseshu, Guru M. Parulkar and George Varghese: "A Reliable and Scalable Striping Protocol", Proceedings SIGCOMM 1996, pp. 131-141. It is noted that these systems are initially designed for asynchronous links.

The mentioned prior art solutions suffer however from a series of problems and disadvantages as summarized above and in the following.

VCAT and LCAS described in ITU-T G.707/ITU-T G.783/ITU-T G.7042 are designed for SDH networks. These systems are not very effective (e.g. SDH overhead, resource requirements for handling of many Virtual Concatenation Group's (VCG's) members). Because of the SDH hierarchy these systems are designed for fixed link bandwidth which limits the use of adaptive modulation and coding.

The bundling systems described in the paper of Adiseshu et al. are designed for asynchronous links. With an asynchronous aggregation system it gets very complicated to handle adaptive modulation and coding. Although we may foresee solving this problem by packet transmission with sequence numbers, still such a solution would result in causing more latency. In particular the transmission of low rate TDM services in packets causes a high delay.

In summary, the prior art does not provide a resource efficient and flexible solution for aggregating data over a communication network. With reference to radio links, furthermore, there is no radio system which makes an effective use of resources.

SUMMARY

An object of the present invention is to provide improvements over known prior art techniques of grouping or ungrouping traffic onto or from a defined connection comprising a plurality of links.

According to a first embodiment of the present invention, a network entity is provided for grouping traffic in a communication network onto a defined connection comprising a plurality of output links. The network entity is a component of the communication network adapted for handling traffic.

In one example the network entity is a network node or device. In other examples, the network entity may be distributed over several network nodes or devices or may be comprised within a network node or device. The network entity may be implemented in hardware, software or any suitable combinations thereof.

The traffic comprises all type of information that can be communicated over the communication network. Examples of traffic are data, voice, signaling messages or overhead information associated to other transmitted information like data or voice. The network entity is suitable for grouping the traffic arriving at the network entity and that is supposed to be forwarded by the network entity. The network entity is adapted to group the traffic onto a defined connection comprising a plurality of output links. Grouping traffic implies that the traffic, which is incoming the network entity, is recombined or rearranged when or before being output from the network entity. In other words, the same information or parts of the information received at the network entity are output from the network entity in a recombined or rearranged form. The output links which form the defined connection are any kind of links suitable for carrying the recombined or rearranged traffic output from the network entity. The defined connection is any type of connection, physical or logical, suitable for being established between the network entity and another network entity. In one example, the defined connection can be a point to point connection.

The mentioned traffic comprises a plurality of input streams wherein each input stream carries symbol blocks. An input stream is a succession over time of information comprised in the mentioned traffic. For example, it may be a succession of information related to data, voice, signaling or any other type of information exchanged within the network. A stream may be associated to an input connection, physical or logical, or to a set or group of input connections, physical or logical, wherein these input connections are input to the network entity.

A symbol block represents a predetermined unit of the information comprised in said traffic. A symbol block can for instance be a single bit or a given number of bits. In another example a symbol block can be a word that, depending on the architecture chosen for implementing the system, may comprise 8, 16, 32, 64, etc. . . . bits.

The network entity according to this embodiment of the invention further comprises a scheduler for associating, for all symbol blocks that are to be transmitted during a predetermined time interval, each of the symbol blocks that are to be transmitted with a corresponding output link according to a one to one correspondence. In other words, the scheduler associates, during a predetermined time interval, each symbol block that needs to be transmitted during this predetermined time interval to an output link so that it can be forwarded onto the defined connection. The association is made according to a one to one correspondence. The predetermined time interval indicates a known or predetermined duration in time. In one example, the predetermined time interval comprises the duration in time of a frame of a time division multiplexing protocol. The scheduler of the network entity can be implemented in hardware, software or any combination thereof as the skilled person would deem suitable according to circumstances. The one to one correspondence used by the scheduler for associating is a relationship that associates each of the symbol blocks to be transmitted within the predetermined time interval to the output links such that each symbol block is associated to one output link only. It is noted that more symbol blocks to be transmitted within the same time interval can be associated to the same output link. Any kind of relationship is suitable for implementing the one to one correspondence as long as for each single symbol block to be transmitted there is only one output link associated. The one to one correspondence can be calculated within the network entity or may be transmitted to the network entity at predetermined time instants. Examples may be foreseen wherein the one to one correspondence is partly calculated within the network entity and/or partly transmitted to the network entity.

According to a second embodiment of the invention, it is provided a network entity for ungrouping traffic in a communication network from a defined connection comprising a plurality of input links onto a plurality of output streams. The network traffic of the second embodiment relates to information in a communication network as explained with reference to the traffic of the first embodiment. According to the second embodiment, the traffic on a defined connection, which can be either physical or logical, is grouped. In one example the grouping is performed by the network entity of the first embodiment. However, it is noted that the network entity of the second embodiment is not limited to such case but is arranged for functioning on any type of grouped traffic transmitted on a defined connection. The network entity of the second embodiment therefore ungroups or disaggregates the traffic from the defined connection into a plurality of output streams. For what concerns the input links and the output streams the same considerations made for the output links and input streams, correspondingly, of the first embodiment are as valid. Similar considerations as made with reference to the first embodiment apply here for the defined connection and the predetermined time interval. The scheduler can be implemented in hardware, software or any suitable combination thereof. When the network entity of the second embodiment is adapted to interwork with the network entity of the first embodiment, it is noted that preferably the number of input links of the network entity of the second embodiment is equal to the number of output links of the network entity of the first embodiment. However, it is noted that the invention is not restricted to this particular case since other situations may be foreseen wherein between the network entity of the first embodiment and the network entity of the second embodiment further nodes may be comprised, e.g. bridge devices. The input links of the second embodiment carry symbol blocks, wherein a symbol block is as defined with reference to the first embodiment. The network entity of the second embodiment further comprises a scheduler for associating, for all the symbol blocks that are received during a predetermined time interval, each of the received symbol blocks with a corresponding output stream according to a one to one correspondence. In other words, the scheduler of the second embodiment associates each of the symbol blocks which are received during the predetermined time interval to an output stream, such that for each of the received symbol blocks there is only one output stream. The one to one correspondence is a relationship which ensures that to each received symbol blocks there is only one output stream to which said received symbol block is associated.

In the example wherein the network entities of the first and second embodiments are arranged for interworking directly over the same defined connection comprising a plurality of links, the one to one correspondence of the two network entities correspond to the same relationship. Thus, the traffic from input streams of the first network entity is grouped, forwarded to the second network entity wherein it is ungrouped to output streams corresponding to the input streams of the first network entity.

However, the invention is not restricted to such a case. For instance, when between the entities of the first and second embodiments further entities are present—like for instance bridging devices—an implementation is foreseen wherein the one to one correspondences of the network entities of the two embodiments correspond to two different relationships.

According to a third embodiment of the invention, it is provided a system for exchanging traffic in a communication network over a defined connection comprising a plurality of links. With reference to the traffic, the defined connection and the plurality of links the same considerations apply as made for, correspondingly, the communication network, the defined connection and the output links of the first embodiment. The system comprises a first network entity for grouping traffic onto the defined connection. The traffic comprises a plurality of input streams, wherein each of the input streams carries symbol blocks. The first network entity further comprises a first scheduler. The first scheduler is adapted to associate, for all the symbol blocks that are to be transmitted during a predetermined time interval, each of the symbol blocks that are to be transmitted with a corresponding link according to a first one to one correspondence. In other words, the one to one correspondence is a first relationship that ensured that for each single block that is to be transmitted during a predetermined time interval there is only one associated link.

The system further comprises a second network entity for ungrouping traffic in the communication network from the defined connection comprising the plurality of links onto a plurality of output streams, wherein the mentioned links carry symbol blocks. In other words, the second network entity is adapted for ungrouping the traffic which was grouped by the first network entity. The second network entity ungroups the traffic onto the plurality of output streams. The second network entity further comprises a second scheduler for associating, for all the symbol blocks that are received during the predetermined time interval, each of the received symbol blocks with a corresponding output stream according to a second one to one correspondence. In other words, the second scheduler of the second network entity is adapted to associate each symbol block which is received in the predetermined time interval to only one output stream. The second one to one correspondence is a relationship that ensures that every received symbol block is associated to only one output stream.

According to a fourth embodiment of the invention, it is provided a method for grouping traffic in a communication network onto a defined connection comprising a plurality of output links. The traffic comprises a plurality of input streams wherein each input stream carries symbol blocks. The method then foresees a step of associating, in a network entity, for all the symbol blocks that are to be transmitted during a predetermined time interval, each of the symbol blocks that is to be transmitted with a corresponding output link according to a one to one correspondence. The same consideration made with reference to the previous embodiments, are also valid for the method for grouping traffic embodying the invention.

According to a fifth embodiment of the present invention, it is provided a method for ungrouping traffic in a communication network from a defined connection comprising a plurality of input links onto a plurality of output streams, wherein each input link carries symbol blocks. The method according to the fifth embodiment comprises the step of associating, in a network entity, for all the symbol blocks that are received during a predetermined time interval, each of the received symbol blocks with a corresponding output stream according to a one to one correspondence. In other words, the method for ungrouping foresees a step of associating each received symbol block with a corresponding output stream. The one to one correspondence is responsible for ensuring that each received symbol block is associated to only one output stream.

According to another embodiment of the present invention, it is provided a computer program product which comprises program parts. The program parts are arranged, when executed on a programmable processor, for conducting the method of grouping traffic according to the above fourth embodiment and/or the method of ungrouping traffic according to the above fifth embodiment.

Furthermore, according to another embodiment of the present invention, it is provided a method which comprises the steps of the methods according to the fourth and fifth embodiments of the present invention.

Further advantageous embodiments of the invention are provided in the independent claims.

One of the advantages provided by the invention consists in a more flexible and efficient usage of network resources for transmitting traffic over a network.

Further advantages will become evident in conjunction with the description of the different examples embodying the invention.

Furthermore, the present invention obviates at least some of the disadvantages of the prior art, as for instance above explained, and provides improved network entities, a system and methods for exchanging traffic in a communication network.

BRIEF DESCRIPTION OF DRAWINGS

FIG. 1 is a functional block diagram of a network entity for grouping traffic according to an embodiment of the present invention.

FIG. 2 is a functional block diagram of a network entity for ungrouping traffic according to another embodiment of the present invention.

FIG. 3 is a functional block diagram of a system for exchanging traffic in a communication network according to an embodiment of the present invention.

FIG. 10 illustrates an example of a scheduling control table at the transmitter and receiver side according to an embodiment of the invention.

FIG. 11 illustrates an example of a scheduling control table with different data width according to an embodiment of the invention.

FIGS. 13A and 13B are schematic flow charts showing an example of generating a look up table according to further embodiments of the present invention.

FIG. 14A shows the Service MUX table produced according to the algorithm of FIGS. 13A and 13B when applied to a specific example;

FIG. 14B shows the Link MUX table produced according to the algorithm of FIGS. 13A and 13B when applied to the same example referred in FIG. 14A;

DETAILED DESCRIPTION

Figure 4:
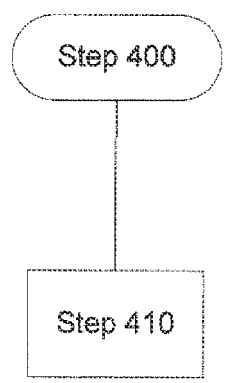
FIG. 4 is a schematic flow chart of a method for grouping traffic in a communication network according to an embodiment of the present invention.

In the following, preferred embodiments of the invention will described with reference to the figures. It is noted that the following description contains examples that serve to better understand the claimed concepts, but should not be construed as limiting the claimed invention.

FIG. 1 schematically illustrates a network entity for grouping traffic in a communication network. The traffic comprises all kind of information that can be transmitted within a generic communication network. Examples of traffic are voice, data, signaling messages, overhead information accompanying voice or data, etc. The defined connection (150) indicates a generic connection, physical or logical, over which the network entity forwards information like voice, data, signaling messages, etc. The connection (150) comprises a plurality of output links (1 . . . L). Grouping implies that the traffic is rearranged, for instance bundled or distributed, before or when being sent out from the network entity.

The output links, representing any kind of physical or logical links to which an output section of the network entity (10) is connected to, are comprised in the connection (150) and are links suitable for carrying the traffic grouped or rearranged by the network entity.

The traffic to be forwarded by the network entity comprises a plurality of input streams (1 . . . S+1 . . . S+A), wherein each input stream carries symbol blocks.

An input stream is a succession over time of information comprised in the mentioned traffic. For example, it may be a succession of information related to data, voice, signaling or any other type of information exchanged within the network. A stream may be associated to an input connection, physical or logical, or to a set or group of input connections, physical or logical, wherein these input connections are input to the network entity.

A symbol block represents a predetermined unit of the information comprised in said traffic. A symbol block can for instance be a single bit or a given number of bits. In another example a symbol block can be a word that, depending on the architecture chosen for implementing the system, may comprise 8, 16, 32, 64, etc. . . . bits.

The network entity comprises a scheduler (100). The scheduler (100) is arranged such that it associates each symbol block of the traffic to be transmitted, therefore received from one of the input streams (1 . . . S+1 . . . S+A), to one of the output links (1 . . . L). The scheduler is arranged to perform this association for all the symbol blocks that are to be transmitted during a predetermined time interval.

Furthermore, the scheduler performs the association according to a one to one correspondence, which is a relationship that ensures that each symbol block incoming the network entity is associated to only one output link going out from the network entity. A predetermined time interval indicates any time interval which has a finite length. In some examples, as it will be explained in the following, the predetermined time interval corresponds to the duration in time of a frame in a time division multiplexing protocol. The scheduler can be implemented in hardware, software or any combination thereof as the skilled person would deem suitable according to circumstances. In other words, the scheduler is adapted to perform the association for each symbol block. In one example, it repeats the step of associating according to the one to one correspondence for each symbol block to be transmitted in the given time period.

The one to one correspondence can be calculated within the network entity or may be transmitted to the network entity at predetermined time instants. Examples may be foreseen wherein the one to one correspondence is partly calculated within the network entity and/or partly transmitted to the network entity. The advantage related to the transmission of the one to one correspondence to the network entity lies in that the network entity results in a less complex entity and in that it can be easily and centrally managed. It is noted that any kind of relationship is suitable for implementing the one to one correspondence as long as for each single symbol block to be transmitted there is only one output link associated.

According to a further embodiment of the invention, one or more of the output links and/or one or more of the input streams may have varying characteristics. The characteristics are indicative of properties of the output links or input streams and may be expressed by parameters. Example of characteristics are the data rate, modulation schemes or modulation parameters, average delay, average noise, typical signal to noise ratio, etc. of a given input stream or a given output link. Some of these properties or parameters may also be interrelated to each other. For instance, the data rate may be directly linked to the modulation parameters chosen for the given stream or link. In other words, the characteristics comprise any kind of parameter that describes the properties of a given link or a given stream. The links can be of any kind, physical or logical, wired or wireless.

The characteristics of the input stream or output links may also refer to parameters indicative of quality attributes of the streams or links. For instance, a characteristic may indicate whether an input stream is characterized by a constant data rate or by a non-constant data rate. In a further example, the characteristics may indicate whether a stream or a link is an idle stream or link, or whether it comprises padding symbol blocks. Characteristics may also express a parameter indicative of a queue identifier of an input stream or output link; of a priority of one of these queues; of a priority of one of the input streams or of one of the output links; of the level of reliability or of the level of protection of one of the input streams or of one of the output links, etc.

The characteristics may further vary over time due to a variety of reasons. For instance, due to operation of the network or network entities comprised in the network; as a consequence to a fault which renders one link or stream not available or which reduces the data rate and therefore the capacity of a given link or a given stream. Changing conditions of the transmission medium may also influence the characteristics of input streams or output links. For instance, the increase of noise or the deterioration of the signal to noise ratio may trigger an adaptation of the modulation parameters, which change to a lower modulation scheme or add error correction (thus reducing available data rate) in order to compensate for the deteriorated conditions of the medium. As it is known, modulation parameters are typical of wired and wireless connections. In the case of output links being radio links characterized by given modulation parameters, a problem that also often occurs lies in that the modulation parameters have to be changed depending on the condition of the medium. For instance, under adverse weather conditions, the attenuation on the medium increases and the signal-to-noise ratio of the receiver decreases thus requiring a modification of the modulation parameters resulting in a decrease of the data rate. Such situation is therefore reflected in the variation of the characteristic of the output link.

According to this further embodiment of the invention, the scheduler is further arranged to adapt to the varying characteristics. In other words, upon variation of the characteristics of at least one of the input streams or one of the output links, the scheduler is configured to associate each received symbol block to an output link according to a one to one correspondence that takes into account the variation of the characteristics. The scheduler, therefore, adaptively performs the association by changing the relationship as a consequence of the characteristics variation.

According to a further embodiment of the invention, the scheduler (100) of the network entity (10) is arranged to determine the one to one correspondence by means of an algorithm on the basis of algorithm parameters. In other words, the scheduler is arranged to perform an algorithm which produces the one to one correspondence. The produced one to one correspondence can then be stored in a memory unit, not shown in FIG. 1, which may advantageously avoid the need to recalculate the one to one correspondence. When needed, therefore, the scheduler may thereafter refer to the stored one to one correspondence and recalculate the one to one correspondence only when at least one of the characteristics of the input streams and/or output links varies. In the following parts of the description, see for instance the parts referring to FIG. 10, 11, 12 or 13, further embodiments will be provided illustrating examples of calculating the one to one correspondence. The one to one correspondence, regardless of whether it is determined through an algorithm or maintained or stored in a storing element of the network entity, may be represented in a variety of forms. In one example, the one to one correspondence can be embodied in a table. An example of a suitable table would be a two columns table, wherein the first column comprises identifications, e.g. numbers, referring to the symbol blocks received from the input streams and the second column includes identifications, e.g. numbers, referring to the output link to which the symbol block of the input stream belonging to the same line of the table has been associated. The table may however have more columns as explained for instance with reference to FIGS. 10 and 11 illustrating further embodiments of tables comprising the one to one correspondence. Furthermore, it is noted that the one to one correspondence does not necessarily need to be represented through a table but may be represented also by other means. For instance, any kind of database or list of linked pointers may be used for representing the one to one correspondence. Further means may be foreseen by the skilled person, as long as they are suitable for representing a relationship between each received symbol block and one output link unambiguously associated to the received symbol block.

As mentioned, the algorithm performed by the scheduler (100) in order to determine the one to one correspondence is based on algorithm parameters. According to a further embodiment, the algorithm parameters may comprise the varying characteristics of the output links (1 . . . L). Therefore, upon the variation of the characteristics of at least one of the output links (1 . . . L), the algorithm parameters would also change. Consequently, the scheduler (100) would execute the same algorithm according to the modified algorithm parameters thus producing a different one to one correspondence which is reflecting the modification of the characteristics of the output links. In one example, if one of the output links fail, e.g. due to a hardware failure of the transmitting or receiving entity or due to a disruption of the transmission medium over which said output link is carried on, the characteristics of that output link would vary thus indicating that for instance the data rate of that output link has become zero. The scheduler (100) would thus perform the calculation of a modified one to one correspondence which takes into account the new conditions on the output links. Another example consists in a modification of the modulation parameters of the output links, for instance in those cases where the output links are radio links having modulation parameters that may be changed. In an illustrative example, under adverse weather conditions, the modulation parameters may be changed from for instance 64 QAM to 8 QAM, in order to allow an error free reception which would not be otherwise possible at higher data rates, i.e. with higher modulation schemes, due for instance to fading or rain which adversely affects the transmission conditions of the medium. Under these circumstances, the scheduler would calculate a modified one to one correspondence, which would consequently take into account the decreased capacity of the output links. Of course, also the opposite situation may be foreseen. For instance, the one to one correspondence may be recalculated after reactivation of a link which had previously failed, upon improvement of the weather conditions allowing an increase of the modulation parameters, etc.

It is noted that the algorithm parameters may also comprise varying characteristics of an input stream. This means that the scheduler is configured to determine the one to one correspondence also upon variation of characteristics of the input streams. Such situation could occur for instance when one of the input stream experiences a failure. The characteristics of that input stream would therefore indicate that the data rate corresponding to that stream suddenly becomes zero. Other situations could of course be foreseen, for instance the addition of a new input stream due to the provision of new services; the change or deterioration of requested data rates due to a change of the provision of existing services; change of priority of one or more streams or queues thereof as change in provisioning of services; etc. As a consequence, therefore, the scheduler would adapt the one to one correspondence on the basis of the variation of the characteristics of at least one of the input streams.

Evidently, the scheduler can also be configured in a further example for adapting the one to one correspondence also in response to a simultaneous variation of the characteristics of at least one input stream and at least one output link.

Thanks to the scheduler, the network entity of the above embodiments is able to automatically respond to changing conditions on the output links and input streams of the network entity. Thus, no intervention is needed by an operator or a network manager in order to adapt to the changed conditions. Since the scheduler performs the association on the basis of symbol blocks, the adaptation can furthermore be achieved in a reliable and flexible way. The advantage of the embodiments thus consist in a very efficient use of resources, thanks to the association made on symbol block basis, and very flexible management of the same resources, thanks to the scheduler producing the adaptive one to one correspondence.

According to a further embodiment of the present invention, the algorithm parameters may be received at the network entity, i.e. may be sent to the network entity for instance by another network entity or by a network manager. This implies that the network entity does not need to be necessarily capable of detecting a change in the conditions in order to correspondingly modify the parameters needed for recalculating the one to one correspondence. The parameters corresponding to the change of the condition of the characteristics may be sent, in one example, by another network device which is able to detect a fault and which timely reports the changed parameter corresponding to the fault to the scheduler of the network entity. According to another example, a network manager or an operator may arrange for sending the parameters to the scheduler of the network entity, wherein the parameters reflect for instance the change of configuration of the network, e.g. the addition of new links, the addition of new streams as consequence of the change of provisioning of service, etc. Evidently, other examples may be foreseen as long as they provide the network entity with at least part of the one to one correspondence or with information allowing the scheduler to produce at least part of the one to one correspondence. The advantage of this embodiment relies in a more flexible operation of the network entity, which is therefore adapted to timely and easily respond to any kind of situation. The parameters may be sent at regular intervals, for instance corresponding to programmed maintenance schedule of the network, or may be sent upon a triggering condition. In one example, the triggering condition may be a detection of a fault or the detection of a worsening in the condition of the medium as for instance during adverse weather conditions (e.g. fading or rain affecting a wireless medium).

As mentioned, the network entity may further comprise a memory, not shown in FIG. 1, for storing the one to one correspondence. The one to one correspondence may be stored in a number of ways as the reader would directly recognize. For instance, tables may be used having two, three or four columns according to circumstances. FIGS. 10 and 11 show examples of tables having three or four columns according to two embodiments of the invention. It is noted that also a table having only two columns would be enough, as explained earlier in this specification. Such a table may be derived from the one of FIG. 10 by removing the first column which reports a progressive number of the symbol blocks to be transmitted during a predetermined time interval. However, the table is only an illustrative way for storing the one to one correspondence. Other ways may be foreseen, for instance by use of a database, a list of pointers, etc. as long said means allow storage or representation of a correspondence between two types of information.

According to a further embodiment, a part of the stored one to one correspondence or the entirety of the one to one correspondence may be transmitted to the network entity prior to the storing. In one example, only a part of the table, or of the database or of the list representing the one to one correspondence may be sent to the network entity, which thereafter stores the received information in the memory.

In previous examples of the invention, it has been explained that the algorithm parameters may be transmitted to the network entity such that the scheduler may calculate the one to one correspondence accordingly. However, according to another embodiment of the present invention, it is foreseen that the network entity receives the entire one to one correspondence without the need to perform any calculation. Such configuration has the advantage of having a network entity characterized by less complexity and therefore easier to implement. The calculation of the one to one correspondence may therefore be delegated to another network entity. The construction of the network entity would therefore be easier and thus requiring less maintenance. Of course, implementations may be foreseen wherein only a part of the one to one correspondence table is sent to the network entity and not the entirety of the one to one correspondence. According to the different implementations, this may be further implemented by sending only a part or the entirety of the table, the database or the list representing the one to one correspondence.

According to a further embodiment of the invention, the network entity may further comprise a multiplexer for producing a service stream from the input streams. The network entity also comprises a de-multiplexer for distributing the service stream to the output links, wherein the multiplexer and the de-multiplexer are adapted to be operated according to the one to one correspondence. According to this embodiment, the network entity (10) comprises a multiplexer for creating a service stream starting from the plurality of input streams. In other words, the multiplexer serializes the symbol blocks received from the plurality of input streams in one single stream herewith referred to as service stream. The de-multiplexer comprised in the network entity (10) is operated such that it distributes the symbol block serialized in the service stream to the output links. In other words, the de-multiplexer operates a distribution of serialized blocks to a plurality of output links. The network entity operates the multiplexer and the de-multiplexer according to the one to one correspondence such that each symbol block received from the input stream is associated to only one output link. The multiplexer and de-multiplexer may be in one example operated under the control of the scheduler. A further example of this implementation will also be explained with reference to FIG. 8.

It should be noted, that the implementation of the network entity is not restricted to the multiplexer and de-multiplexer described above. In fact, the distribution of received symbol blocks to the output links may also be realized by means of a second memory unit which is shared by an input side of the network entity for receiving symbol blocks from the input streams and an output side of the network entity sending symbol blocks to the output links. The received symbol blocks could be stored in said shared second memory, not illustrated in FIG. 1; the network entity, for example by means of the scheduler, may be further arranged such that a stored symbol block gets associated to an output link by the scheduler. Thereafter, the output link is adapted to read the associated symbol block from the shared second memory in order to transmit it out of the network entity over the associated output link.

Further variations may also be foreseen, whether the additional memory rather than being shared by the input streams and output links is instead to be found only on the input side, i.e. in relation to the input streams, from which the symbol blocks are transferred to the output links after having been associated by the scheduler. One more implementation would foresee the usage of an additional memory associated with the output links, wherein the symbol blocks received from the input streams are stored after having been associated to an output link by the scheduler. Thereafter, the associated symbol blocks are transferred to the output links. As the reader will directly recognize, any suitable combination of the previously described solutions is suitable for carrying out the invention. Furthermore, the second or additional memory described above may be comprised in the previously described memory storing the one to one correspondence.

The usage of the association on a symbol block basis allows a very efficient usage of the memory and thus results in a network entity having low memory requirements. The construction of the network entity results therefore simple and inexpensive.

According to a further embodiment of the invention, the input streams (1 ... S+1 ... S+A) may comprise at least one constant data rate input stream (in FIG. 1, any of the illustrative links denoted as 1 ... S) and at least one non-constant data rate input stream (in FIG. 1, any of the illustrative links denoted as S+1 ... S+A). Constant data rate input stream implies that the data rate is constant for at least a certain given amount of time, i.e. until there is a change in the provisioning of the service or unless there is a fault in the network. Non-constant data rate are instead all those streams which do not have a constant or predetermined data rate. Examples of non-constant data rate streams are those characterized by a data rate which can suddenly vary without prediction. Examples of non-constant data rate are bursty data traffic; Ethernet traffic, etc. Another example of a non-constant data rate is a stream which is idle. A further example is a stream comprising padding information without carrying information associated to services. The advantage of such embodiment consists in that the network entity is adapted for grouping different kinds of input streams, therefore enhancing its flexibility.

The usefulness of introducing idle stream will also become apparent from the following example. Let us consider the case wherein one non constant data rate input stream is intended to transmit data, for instance Ethernet data. When the stream has no data to transmit (e.g. the corresponding FIFO is empty) idle data must be inserted at the transmitter and removed at the receiver. The idle guarantees that the association of symbol blocks is still maintained also when there are no data to be transmitted. The idle allows also rate adaptation.

It should be noted that the invention foresees the possibility of having more than one non constant data rate input stream. When this is the case, the characteristics of the input streams may take into account the proportion of each non constant data rate input stream, for instance by means of weights parameters that can be input to the algorithm.

According to a further embodiment of the invention, the sum of symbol blocks of at least one non-constant data rate input stream (S+1) is adapted according to the difference between the sum of symbol blocks of the output links (1 ... L) and the sum of symbol blocks of the constant rate input streams (1 ... S). In other words, the sum of symbol blocks of the non-constant data rate can be calculated as the difference between the symbol blocks of the output links (1 ... L), representing the capacity of the defined connection (150), and the sum of symbol blocks of the constant data rate input streams (1 ... S), which are fixed, at least for a certain given period of time, since the rate of those stream is constant. The advantage of this embodiment lies in that it is possible to efficiently and flexibly use the resource of the output links (1 ... L) comprising the defined connection (150) depending on the conditions of the input streams and the conditions of the output links. For instance, when the sum of the data rates of the input streams is lower than the capacity of the output links the difference would represent available resources on the defined connection (150). These available resources on the defined connection, which may be called also "spare capacity", may be efficiently used by the non-constant data rate streams. For instance, the available resources may be used for carrying best effort traffic (or Ethernet traffic, or generic data traffic) up to the amount allowed by the "spare capacity". Alternatively, the available resources may be filled with an idle stream which would then allow for rate adaptations between the input streams and the output streams. According to a further alternative, the available resource or "spare capacity" could be used for providing protection or redundancy.

The available resources of "spare capacity" may vary due to the variation of the characteristics of the input streams or output links. The at least one non constant data rate stream (S+1 ... S+A) would therefore be automatically adapted according to the available resources. In the above example, therefore, the non-constant data rate input stream is adapting to the network conditions like faults, change of data rates for instance on the output links due to variation of the modulation parameters, etc. Evidently, the available resources on the output links may also be zero when the sum of symbol blocks of the constant data rate streams is equal to the sum of symbol blocks of the output links.

Situations could also occur wherein the sum of symbol blocks on the output links is lower than the symbol blocks of the symbol blocks to be transmitted, for instance of the symbol blocks of constant data rate streams. In such situations, the scheduler may be appropriately instructed to use a modified one to one correspondence in order to adapt to said condition. For instance, by changing the characteristics relating to the priorities of at least an input stream, the one to one correspondence may be recalculated and as a consequence one of the input streams may be dropped.

According to a further embodiment of the invention, the network entity is suitable for operating when the input streams and/or the output links are arranged in frames of a time division multiplexing protocol. In this case, the frame would have a duration corresponding to the predetermined time interval comprising the symbol blocks to be transmitted by the network entity. Examples of time division multiplexing protocols are PDH, SONET/SDH, Integrated Services Digital Network (ISDN), as well as all other protocols which foresee the use of a frame structure which repeats at regular intervals over time. In the following, for instance with reference to FIG. 6, 8 or 13, examples will be given of a network entity applied to a network implementing a time division multiplexing protocol.

In a further embodiment of the invention, the network entity described above comprises a point-point radio transmitter and/or a point-point radio receiver. In this embodiment, the network entity is therefore adapted to perform a point-point radio communication with another network entity adapted to interoperate with the network entity then of FIG. 1.

According to the above embodiments, therefore, it can be obtained a system which uses link bundling with word-by-word scheduling and adaptive modulation simultaneously. The system may be in further embodiments a radio system.

Reference will now be made to FIG. 2, showing an illustrative block diagram of a network entity (20) for ungrouping traffic in a communication network. The network entity (20) is adapted for ungrouping traffic in a communication network from a defined connection comprising a plurality of input links (1 ... L') onto a plurality of output streams (1 ... S'+1 ... S'+A'), wherein for the network traffic the same considerations apply as made above. In one example the grouping is performed by the network entity (10) described with reference to FIG. 1. However, it is noted that the network entity (20) is not limited to such case but is arranged for functioning on any type of grouped traffic transmitted on a defined connection. The network entity (20) for ungrouping traffic is therefore adapted to ungroup or disaggregate the traffic from the defined connection into a plurality of output streams (1 ... S'+1 ... S'+A'). For what concerns the input links and the output streams the same considerations apply as made for the output links and input streams, correspondingly, with reference to the network entity for grouping traffic of FIG. 1. Similar considerations as made earlier with reference to FIG. 1, apply here for the defined connection, the predetermined time interval and the symbol blocks.

The network entity (20) further comprises a scheduler (200) for associating, for all the symbol blocks that are received during a predetermined time interval, each of the received symbol blocks with a corresponding output stream (1 ... S'+1 ... S'+A') according to a one to one correspondence. In other words, the scheduler of the second embodiment associates each of the symbol blocks which are received during the predetermined time interval to an output stream (1 ... S'+1 ... S'+A'), such that for each of the received symbol blocks there is only one output stream (1 ... S'+1 ... S'+A'). The one to one correspondence is a relationship which ensures that to each received symbol blocks there is only one output stream to which said received symbol block is associated. In other words, the scheduler is adapted to perform the association for each symbol block. In one example, it repeats the step of associating according to the one to one correspondence for each symbol block to be transmitted in the given time period.

The scheduler (200) can be implemented in hardware, software or any suitable combination thereof. In one example, the network entity (20) is adapted to interwork with the network entity (10) of FIG. 1: in this case the number of input links of the network entity (20) is preferably equal to the number of output links of the network entity (10). However, it is noted that the invention is not restricted to this particular example. Other situations may be foreseen wherein between the network entity (10) and the network entity (20) further nodes are comprised, e.g. bridge devices. The input links (1 ... L') carry symbol blocks, wherein a symbol block is as defined previously.

Further modification of the network entity (20) depicted in FIG. 2 can be made as described with reference to the network entity (10) of FIG. 1. For instance, also the network entity (20) may be adapted such that the scheduler (200) is arranged for adapting to varying characteristics of the input links and/or output streams. Furthermore, the scheduler (200) may be arranged to calculate the one to one correspondence according to an algorithm based on algorithm parameters. The algorithm and parameters thereof may be the same as the ones implemented in network entity (10) or may be different and distinct in a modified embodiment, as long as said algorithm and algorithm parameters are suitable for producing the one to one correspondence for network entity (20). In a further embodiment, the algorithm parameters may comprise varying characteristics of at least one of the input links and output streams. The algorithm parameters or the one to one correspondence may be received by the network entity (20) as described with reference to the network entity (10) of FIG. 1. Furthermore, similar consideration apply to the network entity (20) as made for network entity (10) with reference to the constant data rate streams and non-constant data rate streams, to the adaptation of the one to one correspondence according to the difference between the sum of symbol blocks of the input links and sum of symbol blocks of output streams. The one to one correspondence of network entity (20) can be represented in the same ways as described for network entity (10). For instance as a table, database, list, etc. The network entity may be further realized by means of a de-multiplexer and multiplexer. A detailed example will be given with reference to FIG. 9. Evidently, different implementations using a second or additional memory are possible as described with reference to the network entity (10) of FIG. 1. In summary, it is possible to put into practice variations and further embodiments of the network entity (20) corresponding to those made for the network entity (10) of FIG. 1.

In the example wherein the network entities (10) and (20) are arranged for interworking directly over the same defined connection (150) comprising a plurality of links, the one to one correspondence of the two network entities (10) and (20) correspond to the same relationship. Thus, the traffic from input streams (1 ... S+1 ... S+A) of the first network entity is grouped, forwarded to the second network entity wherein it is ungrouped to output streams (1 ... S'+1 ... S'+A') corresponding to the input streams of the first network entity. In such an example S would be equal to S' and A to A'.

However, the invention is not restricted to such a case. For instance, when further entities (e.g. bridging devices) are present between the network entities (10) and (20), an implementation is foreseen wherein the one to one correspondences of the network entity (10) is different from the one to one correspondences of the network entity (20).

The network entity (10) and (20) may also be implemented in the same network entity, which would comprise a first part including the network entity (10) and a second part including the network entity (20). Such network entity would therefore be adapted to group and forward the grouped traffic over the connection (150) by means of the first part. At the same time, such network entity would be also suitable to ungroup and forward the ungrouped traffic received from the connection (150) by means of the second part. The two parts may implement different and distinct one to one correspondence, one valid for grouping traffic to be forwarded and one valid for ungrouping the received traffic. Such implementation would allow an asymmetric configuration of the defined connection (150, 250, 350). In another example, the two parts would implement the same one to one correspondence. Such configuration would result in a less complex construction and implementation of the network entity.

Reference will now be made to FIG. 3, wherein an illustrative system according to another embodiment of the invention is depicted. The system of FIG. 3 is adapted to exchange traffic in a communication network over a defined connection (350) comprising a plurality of links. The links may be in certain examples the same as the output links (1 ... L) of FIG. 1 or the links (1 ... L') of FIG. 2. The connection (350) may be in some examples the same connection (150) of FIG. 1 or the same connection (250) of FIG. 2. Similar considerations as made above with reference to the traffic, symbol blocks, links and streams apply also to the system of FIG. 3.

The system comprises a first network entity (10) for grouping traffic onto the defined connection (350). The traffic comprises a plurality of input streams (1 ... S+1 ... S+A), wherein each of the input streams carries symbol blocks. The first network entity further comprises a first scheduler (3100). The first scheduler (3100) is adapted to associate, for all the symbol blocks that are to be transmitted during a predetermined time interval, each of the symbol blocks that are to be transmitted with a corresponding link according to a first one to one correspondence. In other words, the one to one correspondence is a first relationship that ensures that for each single block that is to be transmitted during a predetermined time interval there is only one associated link.

The system further comprises a second network entity (320) for ungrouping traffic in the communication network from the defined connection (350) comprising the plurality of links onto a plurality of output streams (1 . . . S'+1 . . . S'+A'), wherein the mentioned links carry symbol blocks. In other words, the second network entity is adapted for ungrouping the traffic which was grouped by the first network entity. The second network entity ungroups the traffic onto the plurality of output streams. The second network entity further comprises a second scheduler (3200) for associating, for all the symbol blocks that are received during the predetermined time interval, each of the received symbol blocks with a corresponding output stream according to a second one to one correspondence. In other words, the second scheduler (3200) of the second network entity (320) is adapted to associate each symbol block which is received in the predetermined time interval to only one output stream. The second one to one correspondence is a relationship that ensures that every received symbol block is associated to only one output stream.

In one illustrative implementation of the system of FIG. 3, the first network entity and the second network entity may be arranged to interwork. In such a case, the second one to one correspondence of the second network entity (320) is such that the output streams of the second network entity (320) correspond to the input streams of the first network entity (310). In other words, according to this implementation the first and second one to one correspondences represent the same relationship. According to the specific implementation of the one to one correspondence, in some examples of this implementation the first and second one to one correspondences may be the same, e.g. the table may be the same in the first and second network entities (when the table is chosen for representing the one to one correspondence).

According to another illustrative implementation of the system of FIG. 3, the first and second network entities are inter-related entities that do not communicate directly but through intermediate entities or devices like bridge devices. In said circumstances, the first and second one to one correspondences are not necessarily the same since the relationships they define depend on the intermediate devices operating between the first and the second network entity.

Reference will now be made to FIG. 4, illustrating a flow chart according to a method embodying the invention. The method illustrated by the flow chart of FIG. 4 is for grouping traffic in a communication network onto a defined connection comprising a plurality of output links. The method is suitable, for instance, for operating a network entity as described with reference to FIG. 1. The method then foresees a step (400) of associating, in a network entity, for all the symbol blocks that are to be transmitted during a predetermined time interval, each of the symbol blocks that is to be transmitted with a corresponding output link according to a one to one correspondence. In Step 410 the method may preferably perform a further step of storing the result, or of waiting for a trigger condition in order to repeat step 400, or receiving a one to one correspondence from another network entity, etc. The method of FIG. 4 is however not restricted to the implementation in network entity (10). In fact, it may also completely or partially be performed in another network entity and the produced association resulting in a one to one correspondence may then be transferred to the network entity (10). For instance, a variation of the method may foresee the calculation of the one to one correspondence in one network entity and the transmission of the calculated one to one correspondence to the network entity (10) which perform the grouping accordingly.

Figure 5:
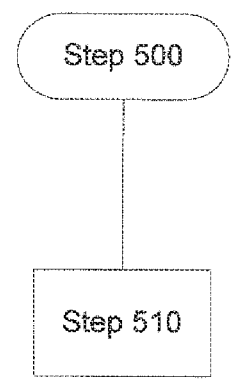
FIG. 5 is a functional block diagram of a method for ungrouping traffic in a communication network according to an embodiment of the present invention.

Reference will now be made to FIG. 5, illustrating a flow chart according to a further method embodying the invention.

Accordingly, it is provided a method for ungrouping traffic in a communication network from a defined connection comprising a plurality of input links onto a plurality of output streams, wherein each input link carries symbol blocks. The method is suitable, for instance, for operating a network entity (20) as described with reference to FIG. 2. The method of FIG. 5 comprises the step of associating, in a network entity, for all the symbol blocks that are received during a predetermined time interval, each of the received symbol blocks with a corresponding output stream according to a one to one correspondence. In other words, the method for ungrouping foresees a step of associating each received symbol block with a corresponding output stream. The one to one correspondence is responsible for ensuring that each received symbol block is associated to only one output stream. The method of FIG. 5 is however not restricted to the implementation in network entity (20). In fact, it may also completely or partially be performed in another network entity and the produced association resulting in a one to one correspondence may then be transferred to the network entity (20). For instance, a variation of the method may foresee the calculation of the one to one correspondence in one network entity and the transmission of the calculated one to one correspondence to the network entity (20) which perform the ungrouping accordingly.

According to another embodiment of the present invention, it is provided a computer program product which comprises program parts. The program parts are arranged, when executed on a programmable processor, for conducting the method of grouping traffic as described with reference to FIG. 4 and/or the method of ungrouping traffic as described with reference to FIG. 5.

Furthermore, it is possible to combine together the methods of FIGS. 4 and 5.

Reference will now be made to further illustrative and non-limiting examples to which the present invention can be applied.

One example is now provided relating to radio transmissions and in particular to a multiplex and bundling technique for transmission of heterogeneous services over an aggregate of multiple point-to-point radio links with adaptive (variable) transmission rates.

The provided example aggregates multiple radio links of variable data rates to form a service independent port with a higher bandwidth as each single link. The radio links are synchronous to a common clock and implement a radio frame (header section and payload section). In the provided example, all radio frames have a common duration and are phase-aligned. Due to adaptive modulation the length of the payload section can vary.

All links together form a service stream which is also framed, synchronous and phase-aligned. Due to adaptive modulation and link protection the data rate of this service stream is variable. Synchronous data services may be synchronized by data rate adaptation (e.g. STM-1, E1/T1, Ethernet) can be added and dropped to this framed service stream.

One service can be used for a packet interface with a variable data rate (e.g. Ethernet, IP). A packet service may require packet additional encapsulation or idle insertion. This could be implemented similar to Generic Framing Procedure (GFP), Link Access Procedure—SDH (LAPS) or Point-to-Point Protocol (PPP). All other services have a fixed rate (e.g. STM-1, E1/T1).

Figure 6:
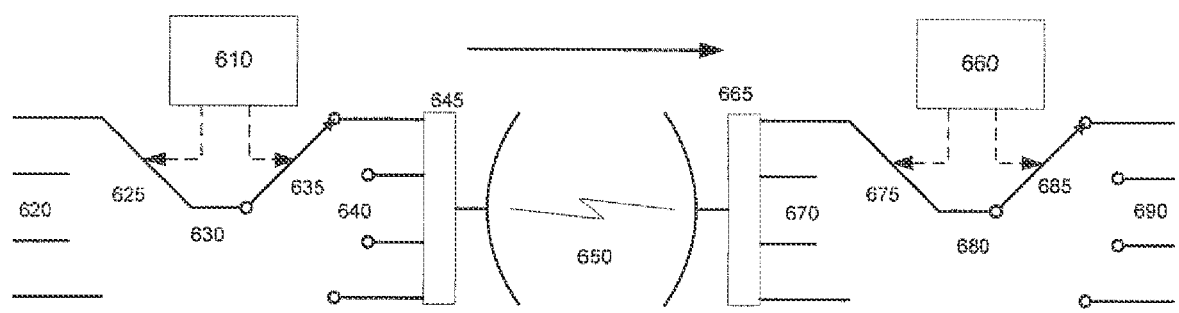
FIG. 6 is a functional block diagram of a basic architecture of a further embodiment of the present invention.

Reference will now be made to FIG. 6, showing a basic architecture of an example to which the invention can be applied. The presented example relates to a synchronous transmission system for heterogeneous services over multiple point-to-point links with variable transmission rates. The links are bundled for increasing bandwidth and reducing latency. In particular the links can be radio channels which use adaptive modulation to adapt the transmission rate to varying environmental conditions such as rain or fading.

The links are synchronous to a common clock and have a frame with header and payload section. All frames are phase aligned and have a common duration but the bit length of payload section can vary e.g. due to adaptive modulation. All links together form a framed service stream with a higher bandwidth. Data services (e.g. STM-1, E1/T1, Ethernet) can be added and dropped to this framed service stream.

The connection denoted with reference sign (650) is one example of the connection (150) of FIG. 1, or (250) of FIG. 2 or (350) of FIG. 3. References 610, 625, 630 and 635 are examples of components comprised in a network entity (10) of FIG. 1. The streams (620) represent the input stream, the links 640 are an example of the links (1 . . . L) output by the network entity (10). In the example of FIG. 6, the links (640) are combined by the combiner (645) in order to be carried on the connection (650). It is noted that this is not an essential feature but only a preferred one according to this example. The service switch (625) and link switch (635) are responsible for distributing the symbol blocks from the input streams (620) to the output links (640). The service switch (625) and link switch (635) operate under control of the transmit switch algorithm (610), which is responsible for operating the switches (625) and (635) such that the one to one correspondence is respected. Reference (630) represents the service stream in the presented example.

Components (660, 675, 680, 685) may be comprised in a network entity (20) as depicted in FIG. 2. The streams (690) are an example of the output streams (1 . . . S'+1 . . . S'+A), the links (670) are an example of the links (1 . . . L') input in the network entity (20). In the example of FIG. 6, the links (650) are combined and distributed to links (670) by means of combiner (665). It is noted that this is not an essential feature but only a preferred one according to this example. The service switch (685) and link switch (675) are responsible for distributing the symbol blocks from the input links (670) to the output streams (690). The service switch (685) and link switch (675) operate under control of the transmit switch algorithm (660), which is responsible for operating the switches (675) and (685) such that the one to one correspondence is respected. Reference (680) represents the service stream in the presented example.

Figure 7:
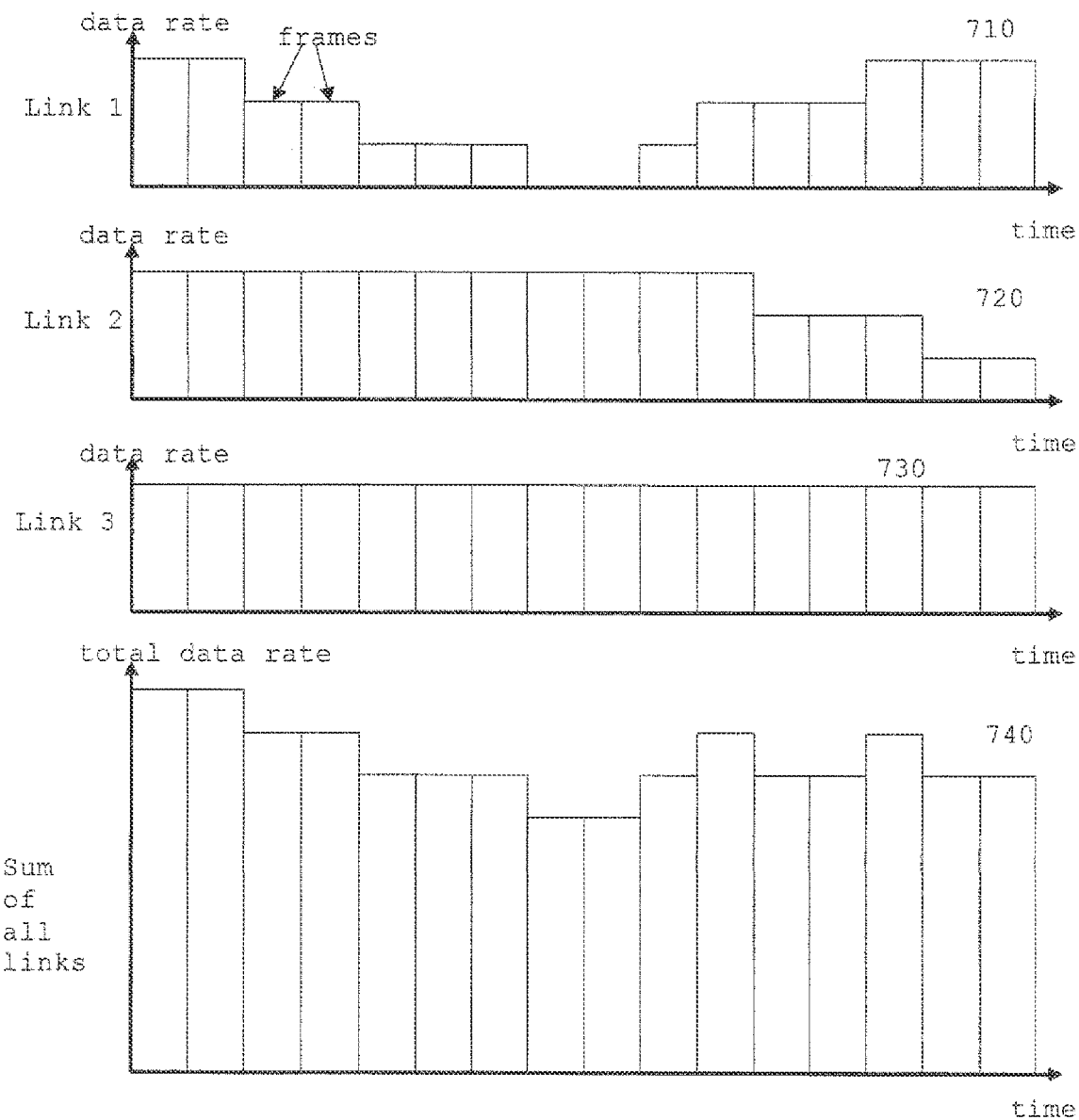
FIG. 7 illustrates an example of link aggregation starting from having three links.

Reference will now be made to FIG. 7 showing an example for the time varying data rates with 3 links. The 3 links of FIG. 7 can be a representation of the links outgoing the network entity (10). The data rates of link 1 and link 2 change over time. The total capacity of the aggregation of the three links is shown in the bottom of the figure. The total capacity is smoother than the capacity of the individual links. Therefore, by grouping links the resources can be more efficiently used and the capacity of the grouped link is smoother.

Figure 8:
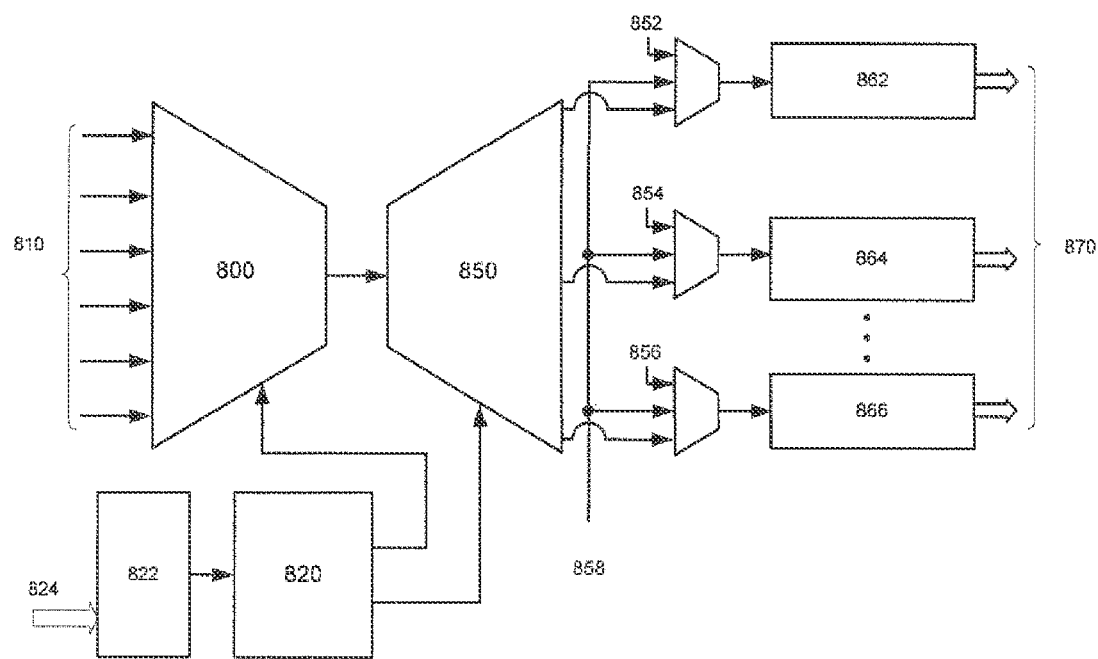
FIG. 8 is a functional block diagram illustrating a transmit scheduling architecture according to a embodiment further of the present invention.

Reference will now be made to FIG. 8, showing one illustrative basic scheduling architecture of the transmitting side. The architecture of FIG. 8 is one example of the network entity illustrated with reference to FIG. 1. It is noted that this is illustrative only and non-restrictive for the invention. As explained previously, in fact, other realizations are also possible.

The architecture of FIG. 8 comprises a Transmission Service Multiplexer (Tx Service MUX 800), a Transmission Link Demultiplexer (Tx Link DEMUX 850), a Calculated Look Up Table (Calculated LUT 820), a counter (822), a clock (824), ingress services (810), Link Control Data (852, 854, 856), Common Control Data (858), Radio Transmitters with adaptive FEC and modulation (862, 864, 866) and synchronous links with variable rates (870). It is noted that the ingress services (810) and the synchronous links with variable rates (870) are preferably synchronous.

However, also non synchronous streams or links may be adapted. Ways to achieve the adaptation will be explained later.

The TX Service MUX (800) and the Link DEMUX (850) are controlled by a common Lookup Table (LUT 820). The MUX (800) and DEMUX (850) are responsible for grouping the traffic according to the one to one correspondence stored in table (820). The first column of table (820) is only the row index and is not strictly necessary. The second column of the LUT controls the TX Service MUX (800). The third column controls the TX Link DEMUX (850). Besides the transmitter inserts control data. Critical data is transmitted as common control data. It requires efficient transmission error protection and is simultaneously sent on all links. Examples for common control data are service properties (e.g. priority, data rate, queue identifier) and link states (e.g. aggregation data rate which depends on the link's Physical mode used by adaptive modulation (PhyMode)). The link control data is not so sensitive to single transmission errors. Parameters concerns Automatic Transmit Power Control (ATPC), radio field identifier and polarization identifier (for Cross Polarization Interference Cancellation (XPIC)). A radio frame preamble is inserted before each frame, too.

Figure 9:
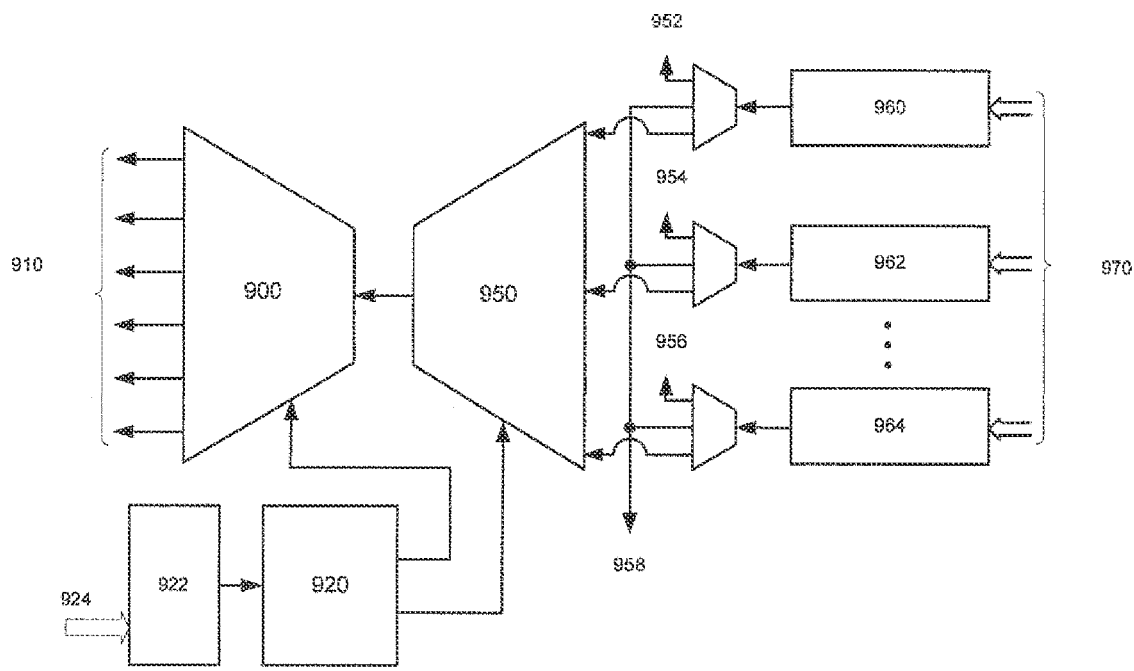
FIG. 9 is a functional block diagram of a receiver scheduling architecture according to a further embodiment of the present invention.

FIG. 9 shows the corresponding scheduling architecture of the receiver. The architecture of FIG. 9 represents an example of the network entity (20) illustrated with reference to FIG. 2. The data flow is in the inverse as depicted in FIG. 8.

The architecture depicted in FIG. 9 comprises a Receiver Service Demultiplexer (RX Service DEMUX 900), a Receiver Link Multiplexer (RX Link MUX 950), egress services (910), a calculated Look Up Table (Calculated LUT 920), a counter (922), a clock (924), common control data (958), Link control Data (952, 954, 956), radio receivers with adaptive FEC and modulation (960, 962, 964), links with variable rates (970). It is noted that the egress services (910) and the synchronous links with variable rates (970) are preferably synchronous.

In one example, the data within the network entity corresponding input streams and input links and the scheduler are synchronous to a common clock. When the data incoming from the input streams is not synchronous to the common clock, then an adaptation may be performed. This adaptation of non-synchronous stream to the internal clock is an optional implementation that will be described later.

At the first stage the preamble is used for frame synchronization and the control data is extracted. Then the frame data is forwarded to the link and service scheduler which uses an identical LUT (920) as the transmitter. The third column of the LUT controls the RX LINK MUX (950). The second column controls the RX Service DEMUX (900).

FIG. 10 shows an example for a scheduling control Lookup Table (LUT). Generally both directions of a link are independent. So the LUTs for transmit and receive direction can differ. This allows a very flexible realization. The LUT stores in this example the one to one correspondence of the invention.

The entries of the LUT are calculated by an adaptation algorithm which uses the same input parameters on both sides of the aggregation. The result of the adaptation algorithm must be unique. The table can be stored in memory or calculated in each frame once again.

Figure 12:
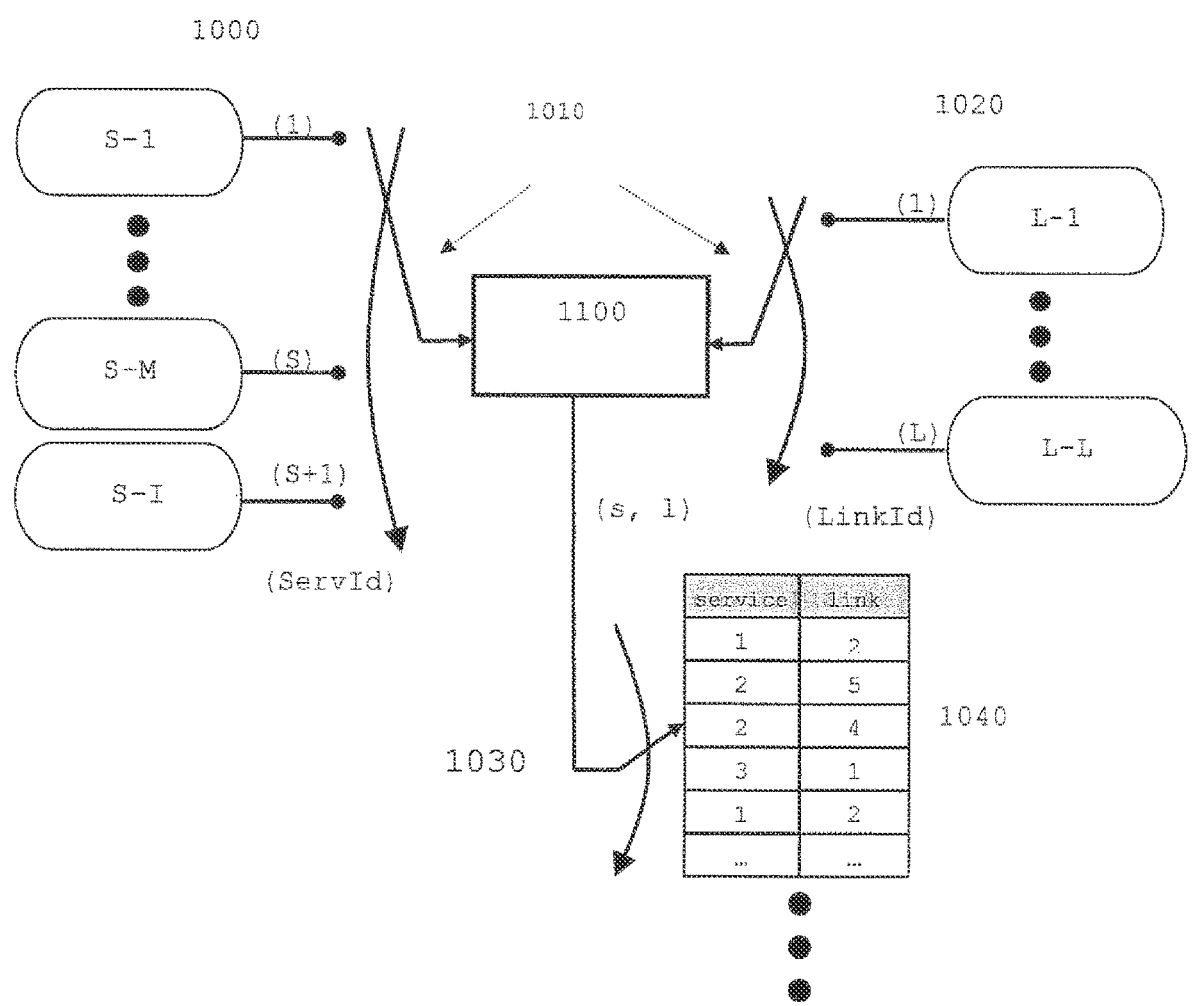
FIG. 12 illustrates a scheduling control table generation according to a further embodiment of the present invention.

FIG. 12 shows an example of how the Look Up Table (LUT) entries for the scheduling control table can be generated. Constant rate models are used for the emulation of the service and link rate. On the left side, reference 1000 indicated constant rate models for services, while reference 1020 on the right hand side refers to constant rate models for links. Blocks S-1, . . . , S-M, S-I refer to service generation 1, M and Idle generation, correspondingly. Reference 1100 indicates an illustrative block for generating ServId-LinkId Pair, i.e. it is an example of generating the one to one correspondence. 1030 refers to a write pointer in the LUT. Blocks L-1 . . . L-L indicated link generation 1 . . . L, correspondingly.

If one of the service models generates a word, this word is scheduled by a strict priority scheduler. The word is an example of the symbol blocks as intended in the present invention. Another scheduler processes the words which are generated by the link models. The results of both schedulers are combined to form a service-link pair which is stored in the scheduling control table.

An algorithm based on counters is summarized in the following. It is noted that the below algorithm is only an example. In fact, other algorithms would be suitable as long as they produce the one to one correspondence as presented previously. According to the present illustrative algorithm, the service rate can be modelled by counters. The links rate can be modelled in a similar way. The main steps of the algorithm can be summarized as in the following.

Definitions

M+1: number of services (M+1: idle, best effort, etc. . . . )
LwCBRk: number of words of service k per frame
LwSFP: total number of words for aggregation=sum over LwCBRk, $1 \leq k \leq (M+1)$ Initialization at Frame Start:
$\forall k$: cbrk=LwCBRk, k=1 . . . M+1
Scheduling Until Frame End
$\forall k$: Service-generation, k=1 . . . M+1
while not all service FIFOs empty:
strict priority scheduling (read from FIFO)
Service-k Generation:
cbrk=cbrk+LwCBRk
if (cbrk$\geq$LwSFP):
generate Cbr-k word (write to FIFO)
cbrk=cbrk-LwSFP Input parameters for the algorithm are the TDM services with data rate (TDM), queue identifier and priority, the Ethernet service with queue identifier and priority, and the current data capacity of all links. Typically only a limited set of different link data rates is used. These are defined by a PHYMODE set (modulation+FEC parameters)

Optional parameters are Ethernet minimum data rate.

Thanks to the association made on a symbol block basis, a high efficiency and flexibility can be achieved. This also results in a simple and straightforward implementation of the transmitter and receiver which do not need any complicated structure or architecture for distributing the traffic thanks to the association on a symbol blocks basis.

There can be further constraints for the scheduling algorithms: e.g. do not distribute a TDM services over multiple links. This can increase the availability for the case that a link suddenly fails (e.g., hardware failure). Under normal circumstances (link is slowly degrading) this is handled by the radio link control (change of adaptive modulation mode). Parameters indicating for instance a slow degradation are examples of the characteristics already introduced in the present invention.

The scheduling algorithm for the LUTs can also use several aggregation groups with different qualities of service. For example, there can be a good group (links with very low error ratio), a medium group (links with low to medium error ratio) and a bad group (lost links or links with high error ratio). All these parameters are examples of the algorithm parameters as previously introduced.

In a preferred embodiment, the present system works fully synchronous to a common clock in each direction. But this is not a limitation for the invention. In fact, asynchronous services and asynchronous channels can be made synchronous with known methods like justification (e.g., bit stuffing like PDH) or pointer processing (e.g. see pointers in SDH/SONET). Thus, the present invention is suitable also for implementation with non-synchronous systems. Further details about adaptation of non-synchronous systems will be later referred.

According to this example, the bundling technique uses adaptive LUTs (Lookup Tables) which allows a very flexible and fast realization. The link and service scheduler can work word-by-word where a word can be 8 bit, 16 bit or 32 bit or something else. A larger word width allows a faster scheduling speed. All these are examples of possible choices for the symbol blocks of the present invention.

For greater efficiency (less padding) at high data rates also mixed implementations are possible. FIG. 11 shows a modified LUT for such an example. The LUT has a fourth column for the data width. The general scheduling width in this example is 16 bit. But some data is scheduling with 8 bit only.

The service and link aggregation is controlled by a control plane. For this purpose additional control data is exchanged between the transmitter and receiver. Some control data (like trigger for PhyMode or service changes, enabling or disabling links from the aggregation) require synchronized actions at transmitter and receiver. Therefore, this data requires a strong protection. This can be achieved by a combination of the following mechanism: repetition; checksum; and transmission over multiple links.

Some other parameters (like new service properties) must not get immediately effective and can be handled by a protocol handshake (e.g. request and acknowledge).

Table 1 below shows the properties of the main control data.

| Parameters | sphere of action | Transmitter action speed (master) | Receiver reaction speed (slave) | error sensitivity | protection mechanism |
|---|---|---|---|---|---|
| preamble, radio field identifier, polarization identifier | Link | static | — | uncritical | — |
| ATPC | Link | medium | medium | low | checksum |
| change of PhyMode, disable/enable link from aggregation | Link | high | high | high | repetition, checksum, multiple links |
| service changes (not effective until trigger) | Aggregation | low | no | high | protocol handshake, checksum, multiple links |
| trigger for service changes (effective date) | aggregation | low | high | high | repetition, checksum, multiple links |
| addition/removal of Links (unused by aggregation) | link/aggregation | low | low | high | protocol handshake, checksum, multiple links |

Figure 13B:
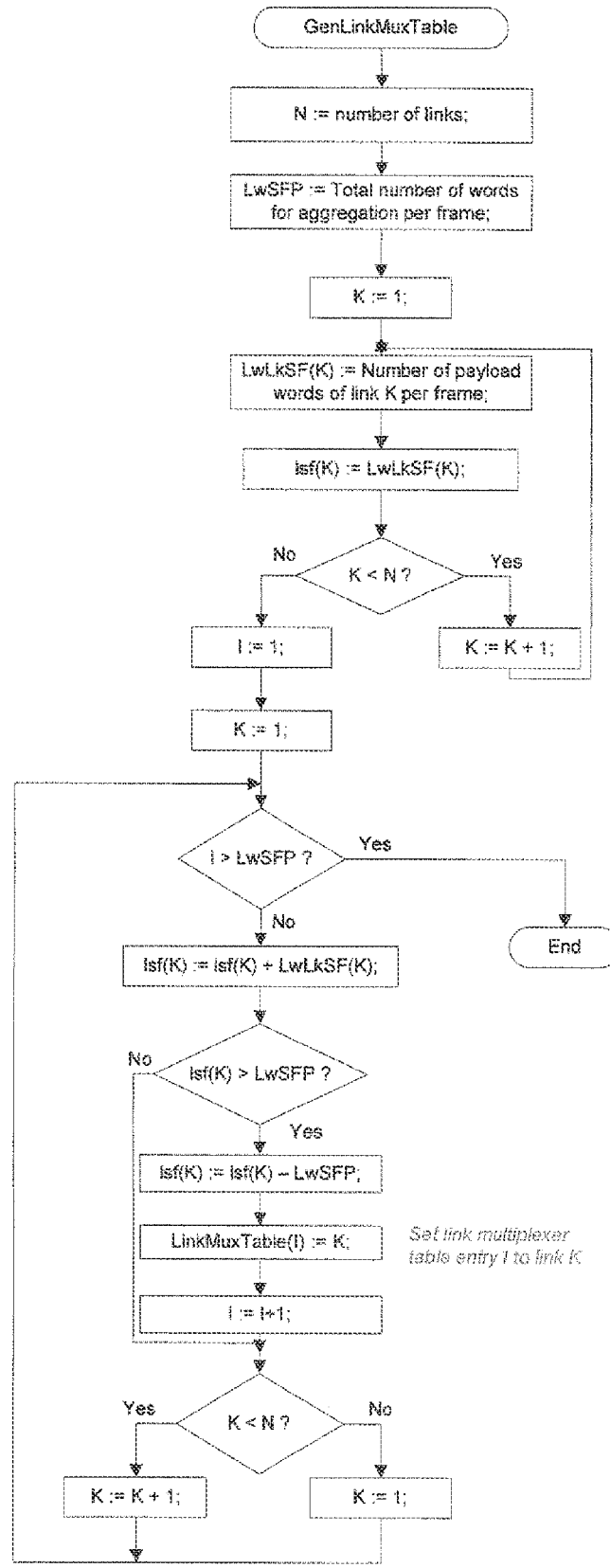

FIGS. 13A and 13B provide further flow charts illustrating an example of generating a look up table according to further embodiments of the present invention. Also this embodiment is based on counter. However, it is noted that any algorithm is suitable as long as it produces a one to one correspondence. In the following it is presented an example to which the algorithm shown in FIGS. 13A and 13B is applied. In the following example, denoted as Example A, low rates are chosen for explanation purposes only.

Example A (Low Rates Only for Explanation)

frame duration=1 ms
byte scheduling
3 links:
Link payload rate A: 2 kbits/s
Link payload rate B: 5 kbits/s
Link payload rate C 1 kbits/s
Þ Aggregation Payload rate: 8 kbits/s
2 services:
Service rate A: 6 kbits/s
Service rate B: 2 kbits/s (e.g. Idle)

When applying the above example A to the algorithm of FIGS. 13A and 13B, the following results are produced as summarized in the below table.

Example A (Result): Service-Link-Mux Table

| Index | ServiceId | LinkId |
|---|---|---|
| 1 | 1 | 2 |
| 2 | 1 | 1 |
| 3 | 1 | 2 |
| 4 | 2 | 2 |
| 5 | 1 | 2 |
| 6 | 1 | 1 |
| 7 | 1 | 2 |
| 8 | 2 | 3 |

FIG. 14A shows the Service MUX table produced according to the algorithm of FIGS. 13A and 13B when applied to the example A illustrated above.

In particular, FIG. 14A illustrates steps for generating the Service-MUX table for Example A, with the following initialization parameters.

Initialization:
M:=2; LwSFP:=8;
LwCBR(1):=6; LwCBR(2):=2;
cbr(1):=6; cbr(2):=2;
I:=1; K:=1.

FIG. 14B shows the Link MUX table produced according to the algorithm of FIGS. 13A and 13B when applied to the example A illustrated above. In particular, FIG. 14B illustrates steps for generating the Link-MUX table for Example A, with the following initialization parameters.

Initialization:
N:=3; LwLkSFP:=8;
LwLkSF(1):=2; LwLkSF(2):=5; LwLkSF(3):=1;
Isf(1):=2; Isf(2):=5; Isf(3):=1;
I:=1; K:=1.

As mentioned earlier in the description, the present invention may also be applied to non-synchronous systems. In the following, it will be illustrated an adaptation between external interfaces and internal interfaces for adapting nonsynchronous systems.

The assumption is made that in one example of the invention, the internal interfaces are synchronous to a common clock (inclusive frame and phase). In the following, it will be explained how a non-synchronous system can be applied to a synchronous implemented system.

If the input streams are not synchronous an adaptation function is required:
For constant data rate but asynchronous input streams the adaptation can be done by known techniques as justification/bit stuffing (see asynchronous multiplexing, e.g., ITU-G.742).
For non-constant data rate input streams (e.g. Ethernet or other packet services) the rate adaptation can be done by idle insertion (constant internal interface rate is faster than current non constant external interface mean rate) or packet discard (constant internal interface rate is slower than current non constant external interface mean rate).

The external interfaces of the output links can be designed as synchronous interfaces with frames phase-aligned to the scheduling frame. In this case adaptation is not required for the link and features like adaptive modulation and coding are easier to handle. If some external link interfaces are not synchronous and phase-aligned, then adaptation techniques like stuffing are also required.

Figure 15A:
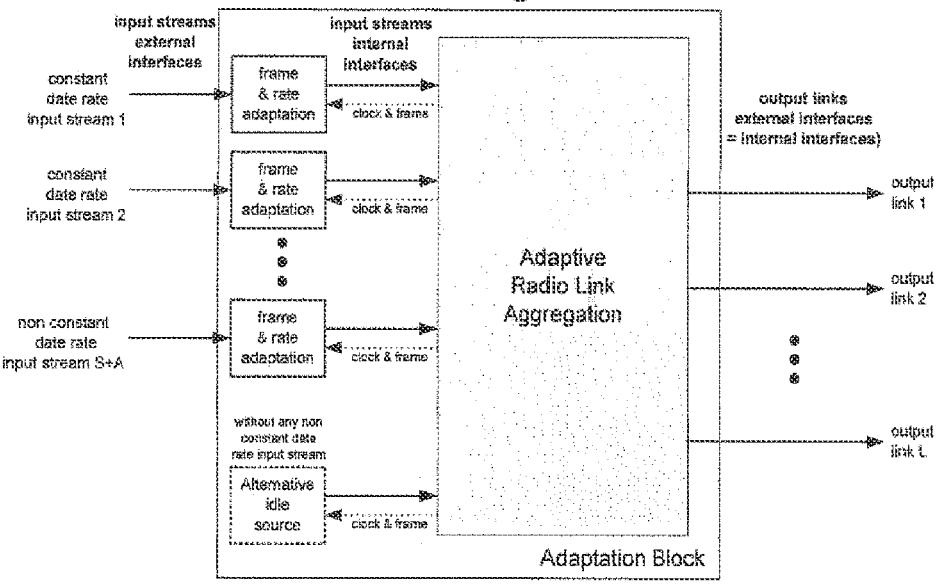
FIG. 15A shows the optional adaptation in the transmitter when a non-synchronous system is adapted to a synchronous implemented system.

FIG. 15A shows the optional service stream adaptation in the transmitter. In the non-limiting example, it is assumed here that the link interfaces are synchronous and do not need adaptation.

Figure 15B:
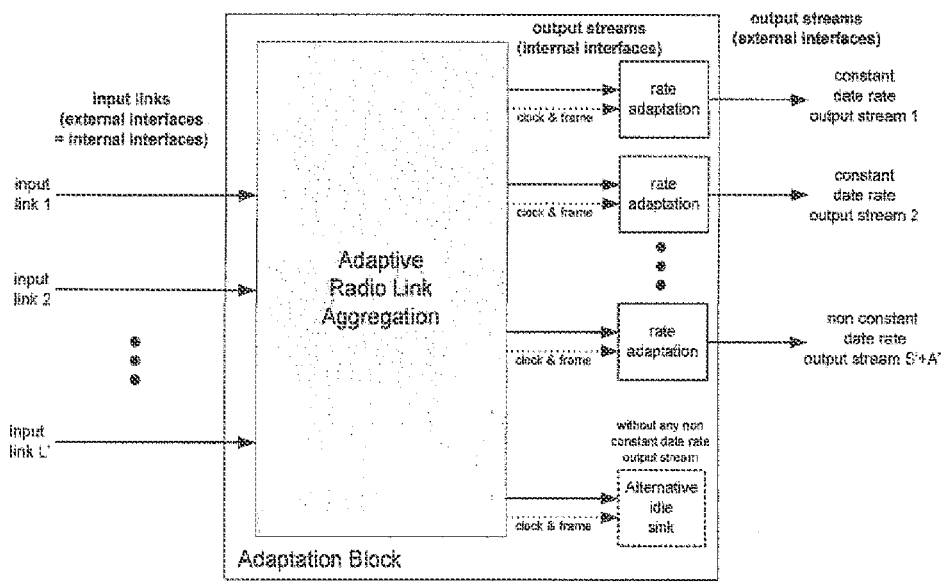
FIG. 15B shows the corresponding adaptation in the receiver when a non-synchronous system is adapted to a synchronous implemented system.

FIG. 15B shows the corresponding adaptation in the receiver. The present invention provides several advantages. The following is only a list of some of the advantage:
- full flexible multi service interface and multi air interface,
- low latency (through byte-by-byte or word-by-word scheduling),
- service prioritization (if not enough capacity available, low priority services fails first),
- high bandwidth efficiency (through adaptive modulation & FEC),
- service reliability (parallel (redundant) transmission of vital control data and link supervision),
- efficient and fast implementation (with LUTs).

The skilled reader would however recognize that further advantages are provided as explained in the present invention or as evident to the skilled reader.

What is claimed is:

1. A network entity comprising:
    processing circuitry configured to:
        receive, from a communication network, a plurality of input streams carrying symbol blocks to be transmitted onto a defined connection over a plurality of predetermined time intervals;
        for each predetermined time interval, distribute each of the symbol blocks to be transmitted during the predetermined time interval to one of a plurality of output links according to a one-to-one correspondence between the symbol block and the one of the output links; and
        adapt a transmission rate of the symbol blocks over the defined connection in response to varying characteristics of at least one among the output links and input streams.

2. The network entity of claim 1, wherein the varying characteristics are received by the network entity from another network entity or a network manager.

3. The network entity of claim 1, wherein to distribute each of the symbol blocks to be transmitted during the predetermined time interval, the processing circuitry is further configured to determine the one-to-one correspondence based on the varying characteristics.

4. The network entity of claim 3, wherein:
    the network entity further comprises a memory configured to store the one-to-one correspondence; and
    the network entity is further configured to receive at least part of the one-to-one correspondence from the communication network prior to being stored in the memory.

5. The network entity of claim 1, wherein the processing circuitry comprises:
    a multiplexer configured to produce a service stream from the input streams; and
    a demultiplexer configured to distribute the service stream to the output links;
    wherein the multiplexer and demultiplexer are configured to operate according to the one-to-one correspondence.

6. The network entity of claim 1, wherein the input streams comprise at least one constant data rate input stream and at least one non-constant data rate input stream.

7. The network entity of claim 6, wherein the processing circuitry is configured to adapt a sum of the symbol blocks of the at least one non-constant data rate input stream according to a difference between a sum of the symbol blocks of the output links and a sum of the symbol blocks of the constant rate input streams.

8. The network entity of claim 1, wherein one or both of the input streams and the output links are arranged in frames of a time division multiplexing protocol.

9. The network entity of claim 1, wherein the network entity further comprises a point-to-point radio transmitter.

10. The network entity of claim 1, wherein the network entity further comprises a point-to-point radio receiver.

11. A network entity comprising:
    processing circuitry configured to:
        receive traffic from a defined connection comprising a plurality of input links, each input link carrying symbol blocks;
        associate each symbol block received during a predetermined time interval with a corresponding one of a plurality of output streams according to a one-to-one correspondence between the symbol block and the one of the output streams based on varying characteristics of at least one among the output streams and input links;
        transmit the symbol blocks received during the predetermined time interval over the associated output streams.

12. The network entity of claim 11, wherein the varying characteristics are received by the network entity from another network entity or a network manager.

13. A system configured to exchange traffic in a communication network over a defined connection comprising a plurality of links, the system comprising:
    a first network entity comprising first processing circuitry configured to:
        receive, from a communication network, a plurality of input streams carrying symbol blocks to be transmitted onto a defined connection over a plurality of first predetermined time intervals, the defined connection comprising a plurality of links;
        for each first predetermined time interval, distribute each of the symbol blocks to be transmitted during the first predetermined time interval to one of the links of the defined connection according to a first one-to-one correspondence between the symbol block to be transmitted and the one of the links; and
        adapt a transmission rate of the symbol blocks over the defined connection in response to varying characteristics of at least one among the links and input streams;
    a second network entity comprising second processing circuitry configured to:
        receive the symbol blocks from the links of the defined connection;
        associate each symbol block received during a second predetermined time interval with a corresponding one of a plurality of output streams according to a second one-to-one correspondence between the received symbol block and the one of the output streams based on varying characteristics of at least one among the output streams and the links;
        transmit the symbol blocks received during the second predetermined time interval over the associated output streams.

14. The system of claim 13, wherein the first network entity and/or second network entity is further configured to receive the varying characteristics from another network entity or a network manager.

15. A method, implemented by a network entity, the method comprising:
- receiving, from a communication network, a plurality of input streams carrying symbol blocks to be transmitted onto a defined connection over a plurality of predetermined time intervals;
- for each predetermined time interval, distributing each of the symbol blocks to be transmitted during the predetermined time interval to one of a plurality of output links according to a one-to-one correspondence between the symbol block and the one of the output links; and
- adapting a transmission rate of the symbol blocks over the defined connection in response to varying characteristics of at least one among the output links and input streams.

16. The method of claim 15, further comprising receiving the varying characteristics from another network entity or a network manager.

17. A method, implemented by a network entity, the method comprising:
- receiving traffic from a defined connection comprising a plurality of input links, each input link carrying symbol blocks;
- associating each symbol block received during a predetermined time interval with a corresponding one of a plurality of output streams according to a one-to-one correspondence between the symbol block and the one of the output streams based on varying characteristics of at least one among the output streams and input links;
- transmitting the symbol blocks received during the predetermined time interval over the associated output streams.

18. The method of claim 17, further comprising receiving the varying characteristics from another network entity or a network manager.

* * * * *

UNITED STATES PATENT AND TRADEMARK OFFICE
CERTIFICATE OF CORRECTION

PATENT NO. : 11,683,739 B2
APPLICATION NO. : 17/237531
DATED : June 20, 2023
INVENTOR(S) : Holger Helmke It is certified that error appears in the above-identified patent and that said Letters Patent is hereby corrected as shown below:

On the Title Page

On Page 2, in Item (56), under "OTHER PUBLICATIONS", in Column 2, Line 3, delete "Intemet:Application" and insert -- Internet: Application --, therefor.

In the Specification

In Column 1, Line 6, delete "2019," and insert -- 2019, now US. Pat. No. 10,993,162, --, therefor.

In Column 1, Line 33, delete "This" and insert -- These --, therefor.

In Column 1, Lines 56-57, delete "(analog-digital-converters) and/or DACs (digital-analog-converters)," and insert -- (analog-to-digital converters) and/or DACs (digital-to-analog converters), --, therefor.

In Column 2, Line 12, delete "or for" and insert -- or --, therefor.

In Column 6, Line 57, delete "a embodiment further" and insert -- a further embodiment --, therefor.

In Column 7, Line 8, delete "example," and insert -- example. --, therefor.

In Column 7, Line 11, delete "14A;" and insert -- 14A. --, therefor.

In Column 7, Line 14, delete "system;" and insert -- system. --, therefor.

In Column 7, Line 22, delete "will" and insert -- will be --, therefor.

In Column 19, Line 3, delete "can" and insert -- and can --, therefor.

In Column 21, Line 26, delete "Servld-Linkld" and insert -- ServId-LinkId --, therefor.

Signed and Sealed this
Fifth Day of December, 2023

Katherine Kelly Vidal
*Director of the United States Patent and Trademark Office*

CERTIFICATE OF CORRECTION (continued)
U.S. Pat. No. 11,683,739 B2

In Column 21, Line 55, delete "End" and insert -- End: --, therefor.

In Column 22, Line 2, delete "parameters)" and insert -- parameters). --, therefor.